United States Patent [19]

Paik

[11] Patent Number: 5,224,380
[45] Date of Patent: Jul. 6, 1993

[54] SUPERCONDUCTING SIX-AXIS ACCELEROMETER

[75] Inventor: Ho J. Paik, Silver Spring, Md.

[73] Assignee: The University of Maryland, College Park, Md.

[21] Appl. No.: 525,718

[22] Filed: May 21, 1990

[51] Int. Cl.$^5$ ............................................. G01P 15/13
[52] U.S. Cl. .................................... 73/510; 73/517 B; 73/517 A
[58] Field of Search ................. 73/517 R, 517 B, 510, 73/382 R, 382 G, 517 A

[56] References Cited

U.S. PATENT DOCUMENTS

| | | | |
|---|---|---|---|
| 3,468,167 | 9/1969 | Klass et al. | 73/517 R |
| 4,841,772 | 6/1989 | Paik | 73/517 R |
| 4,901,017 | 2/1990 | Zinke | 73/517 R |

OTHER PUBLICATIONS

H. A. Chan, et al., Dept. of Physics and Astronomy, Univ. of Maryland, College Park, Md. 20742, "Superconducting Techniques for Gravity Survey and Inertial Navigation", IEEE Transaction on Magnetics, vol. Mag-21, No. 2, Mar. 1985.

H. A. Chan et al., "Development of Three-Axis Superconducting Gravity Gradiometer," Proc. of 17th Int. Conf. on Low Temp. Physics, Karlsruhe, W. G., pp. 927-928, 1984.

*Primary Examiner*—John E. Chapman
*Attorney, Agent, or Firm*—Oblon, Spivak, McClelland, Maier & Neustadt

[57] ABSTRACT

A superconducting six-axis accelerometer (SSA) for measuring the linear and angular acceleration of a superconducting proof mass in all six degrees of freedom at the same point in space time. The proof mass is formed of interlocking plates defining three mutually orthogonal planes and is confined and controlled by superconducting circuitry including superconducting levitation coils which suspend the proof mass against the pull of gravity. Detection of a displacement of the proof mass when an acceleration is applied is possible as the Meissner effect forces the inductance of superconducting sensing coils to change in proportion to the displacement of the proof mass. The sensing coils, which may be the same coils as the levitation coils or may be arranged concentrically with respect to separate levitation coils, are arranged in bridge circuits, each bridge circuit being driven by an independent oscillating current through a tank circuit, having a different carrier frequency. The output of each bridge circuit is dependent upon only one degree of freedom, and are each connected in series to a SQUID amplifier. Lock-in amplifiers, each independently tuned to one of the carrier frequencies, demodulate the SQUID output to recover the individual accelerations.

30 Claims, 13 Drawing Sheets

SUPERCONDUCTING SIX-AXIS ACCELEROMETER

BACKGROUND OF THE INVENTION

1. Field of the Invention

This invention relates to a superconducting six-axis accelerometer and more particularly to improvement in the accelerometer described in the inventor's prior publication, IEEE Transactions on Magnetics, MAG-21, 411 (march 1985), and prior U.S. Pat. No. 4,841,772 descriptions of which are incorporated by reference into the present disclosure.

2. Discussion of the Background

A six-axis accelerometer measures the linear and angular acceleration in all six degrees of freedom at the same point in space time. A superconducting six-axis accelerometer (SSA) operates at liquid helium temperatures and is able to take advantage of the corresponding low thermal noise and extremely high stability of materials and electric currents. The six-axis accelerometer uses the properties of quantized magnetic flux to magnetically levitate a single superconducting proof mass with extreme stability. The superconducting proof mass in the six-axis accelerometer is free to respond to acceleration, like the accelerometer in a superconducting gravity gradiometer.

In a three-axis superconducting gravity gradiometer, three pairs of coupled superconducting acceleration transducers are mounted on the six faces of a precision cube. Each acceleration transducer is a spring-mass type superconducting accelerometer, as shown in FIG. 1, in which an applied acceleration signal produces a displacement of proof masses $m_1$ and $m_2$. The proof mass displacements in the common and differential modes of motion are detected by a coupled superconducting inductance modulation circuit and superconducting quantum interference device (SQUID) amplifiers.

A simplified diagram illustrating the operation of a spring mass accelerometer is shown schematically in FIG. 2. Each accelerometer consists of the superconducting proof mass 20 confined to move along single axis and a spiral superconducting sensing coil 22 located near the surface of the proof mass 20. An acceleration will cause the displacement of the proof mass 20, which because of the Meissner effect will modulate the inductance of the coil 22 at frequencies down to dc. The sensing coil is connected to the input coil 24 of a SQUID amplifier 26 forming a closed superconducting loop. This loop contains a persistent current which couples the mechanical and electrical systems. Since the flux in this loop must remain constant, change in the inductance of the sensing coil results in a current change through the SQUID input coil 24. In this manner very small accelerations can be detected.

A superconducting accelerometer with a pair of spring masses is subject to errors caused by common accelerations that can seriously degrade the performance of the gradiometer because the ground has common accelerations which are several orders of magnitude larger than the extremely weak gravity gradient signals to be measured. As important error source of this kind comes from rotational motions which produce erroneous signals that are indistinguishable from gravity gradients. Although the errors along one of the three axes of a three-axis gradiometer caused by both torsional and tilting motions are minimized when that inline axis is aligned with the vertical, such an orientation of the sensitive axis is not applicable to all three orthogonal axes simultaneously.

The six-axis accelerometer utilizes the same principles of the three axis gradiometer with two major differences:

1. Because the accelerometer has no common mode balance requirement only magnetic levitation (no mechanical spring) is used in the proof mass suspension. The proof mass resonant frequency can therefore be made low even in a simple design.

2. A single common proof mass has all the six degrees of freedom and can be conveniently shared by all the six component accelerometer circuits.

In the accelerometers in the gravity gradiometer, the proof mass position is confined by a mechanical spring and the accelerometer responds to acceleration in inverse proportion to the stiffness of this mechanical spring. On the other hand, the proof mass in the six-axis accelerometer is surrounded by quantized magnetic flux which confines the motion. Each degree of freedom responds to acceleration in inverse proportion to the stiffness of a "magnetic spring".

These magnetic springs are generated by the superconducting coils placed in close proximity to the proof mass. The proof mass excludes the magnetic flux from these coils due to the Meissner effect and any motion of the proof mass forces flux to redistribute itself within the superconducting circuitry. This transfer of energy produces a restoring force which opposes this change and creates electrical equivalent to a mechanical spring. Any displacement of the proof mass can be detected since the Meissner effect forces the inductance of sensing coils to change in proportion to the displacement of the proof mass.

Each degree of freedom is monitored by sensing coils connected together to form a superconducting bridge circuit. The sensing coils of each bridge are selected such that the output of each bridge is responsive to only one degree of freedom. The outputs of all of the bridge circuits are connected to a SQUID amplifier, converting the bridge circuit signals to an output voltage. Recovery of original displacement of the proof mass in each degree of freedom is accomplished through the use of lock-in amplifiers.

A simplified version of this detection technique is shown in FIG. 3 for an accelerometer with one degree of freedom. As proof mass 30 is displaced from equilibrium in the positive x-direction, the sensing inductances L2 and L4 decrease and the sensing inductances L1 and L3 increase. This change in sensing inductance unbalances bridge circuit 32 and an oscillating circuit proportional in amplitude to the misbalance appears across output coil 34. This current is then amplified and converted to an output voltage through the use of SQUID amplifier 36. Demodulation through the use of a lock-in amplifier recovers the original misbalance signal.

SUMMARY OF THE INVENTION

Accordingly, one object of the present invention is to provide a superconducting six-axis accelerometer (SSA) that simultaneously measures three linear and three angular accelerations with improved sensitivity.

A second object of the present invention is to provide a superconducting proof mass which can respond to accelerations in all six directions and which can be levitated by quantized magnetic flux with extreme stability.

A further object of the present invention is to provide coil forms which hold the superconducting coils in close proximity to the proof mass which decreases susceptibility of the superconducting circuitry to RF noise due to eddy current losses, a high frequency loss mechanism.

Another object is to further eliminate RF noise through the use of shielded transformers in the sensing and amplification circuits.

Still a further object is to provide simplified electronic sensing and levitation circuits to improve the reliability and simplify the construction of the SSA.

These and other objects are achieved according to the invention by providing a new and improved superconducting six-axis accelerometer (SSA) provided with a superconducting proof mass free to respond to acceleration in all six degrees of freedom and having a high degree of orthogonality and parallelism. The proof mass contains superconducting planes which face three surfaces each of cubic metallic coil forms. Upon each of the three surfaces of the coil form that face the proof mass are mounted one coil for levitating the proof mass and one superconducting coil for sensing relative motion of the proof mass.

The present invention employs a conducting coil form on which the sensing and levitation coils are mounted to decrease the susceptibility of the superconducting circuitry to RF noise, since eddy current losses in the coil form provide a high frequency noise reduction mechanism.

The coil forms are held in position by cylindrical coil form holders which are mounted inside a precision cube. The coil form holders fit together to form a smaller hollow cube inside the precision cube. The coil forms are mounted in each one of the eight corners of the hollow cube, and the proof mass is positioned in the center of the hollow cube, adjacent to the coil form holders.

The positions of the coils in the SSA are fixed as they are securely attached to the coil forms which are held in place by the coil form holders. Knowing the initial position and orientation of each coil with respect to the SSA allows the computation of the spacing and orientation of each coil with respect to the proof mass. The spacing and orientation allows the calculation of the inductance of each coil in the SSA as a function of the position and orientation of the proof mass.

The distance from the center of each coil to the adjacent proof mass surface, and the orientation of each coil with respect to the adjacent proof mass change with movement of the proof mass. This change in position of the proof mass forces the inductance of each coil to change since the Meissner effect excludes all magnetic flux from the body of proof mass.

The sensing coils are arranged in six inductance bridges in a first superconducting circuit. An AC carrier current is applied from an external oscillator to each of the inductance bridges, and each bridge has an output indicative of one degree of freedom of acceleration of the proof mass.

According to the present invention, each current applied to each of the six sensing inductance bridges has a different frequency. The output currents of each sensing bridge are fed to a superconducting quantum interference device amplifier (SQUID). The SQUID is connected to six lock-in amplifiers having a tuned frequency equal to the respective frequencies of the currents of the sensing inductance bridges. The six lock-in amplifiers thereby allow the recovery of currents indicative of all six degrees of freedom of acceleration of the proof mass.

The currents are introduced into the sensing inductance bridges through a tank circuit comprised of a transformer and a capacitor. The resonant frequencies of the tank circuits are equal to the frequency of the current introduced into each bridge. The tank circuits thereby both amplify the in-band current inputted into the bridge and act as a band pass filter to reject other frequencies. By amplifying the input current, the tank circuits allow smaller currents to be introduced from the external current source, thus minimizing the heat introduced into the system.

The levitation coils are arranged in three loop circuits and three inductance bridge circuits. Persistent currents are stored in the loop and bridge circuits which apply a force against the proof mass, thereby magnetically levitating the proof mass. The loop circuits levitate the proof mass in the linear degrees of freedom and the bridge circuits levitate the proof mass in the angular degrees of freedom.

The levitation loop and bridge circuits also contain a transformer allowing the introduction of a feedback current which is proportional to the sense acceleration, thereby keeping the proof mass in a null position.

According to the present invention, the transformers in the various circuits are shielded to avoid the introduction of RF noise into the superconducting circuits. Minimizing the RF noise introduced into the superconducting circuits is crucial to a stable and precise operation of the SSA.

The proof mass is, according to the present invention, preferably comprised of interlocking plates which interlock in three mutually orthogonal planes. A proof mass thus formed provides the high degree of orthogonality required by the SSA.

In a second embodiment, each superconducting coil both senses the relative motion of and levitates the proof mass. As a result, only one half the number of coils as compared to the first embodiment are used, simplifying the superconducting circuitry. The sensing-levitation coils are also larger than those used in the first embodiment which increases the sensitivity of the device, increases the reliability of the levitation and allows the use of smaller currents. The coils are arranged in bridge circuits which are connected to a single SQUID.

A third embodiment of the present invention employs six SQUIDS to separately amplify the output of each of the sensing-levitation bridge circuits, which provides an increase in detection bandwidth and sensitivity of the SSA.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
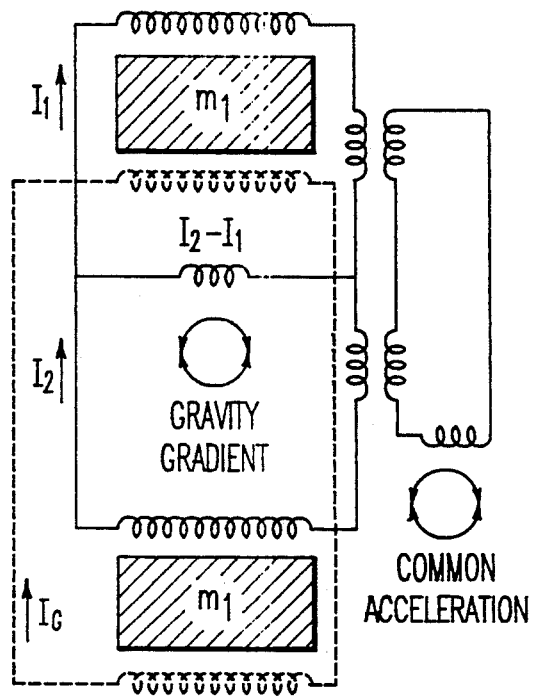
FIG. 1 is a schematic diagram of a superconducting circuit for a single-axis gravity gradiometer according to the prior art.
Figure 2:
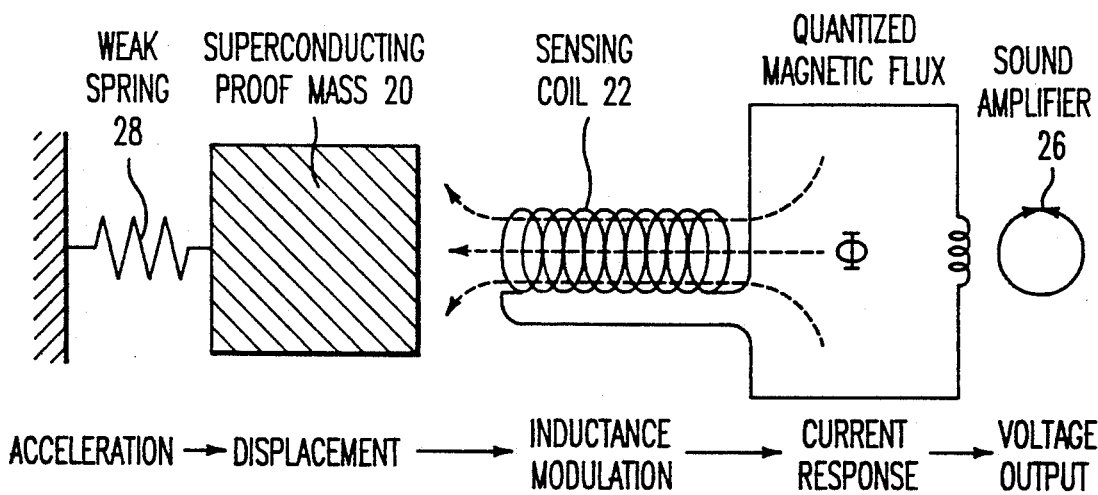
FIG. 2 is a schematic diagram of a conventional superconducting accelerometer.
Figure 3:
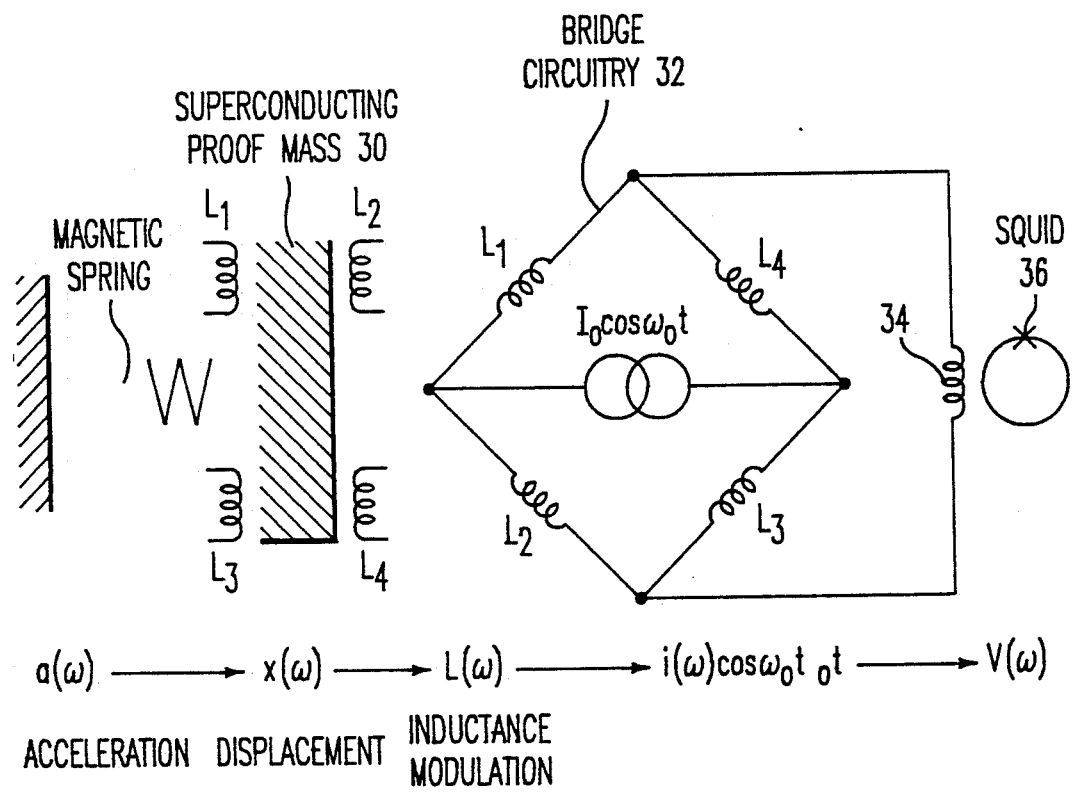
FIG. 3 is a schematic circuit diagram illustrating the principle of a conventional superconducting bridge acceleration transducer.
Figure 4:
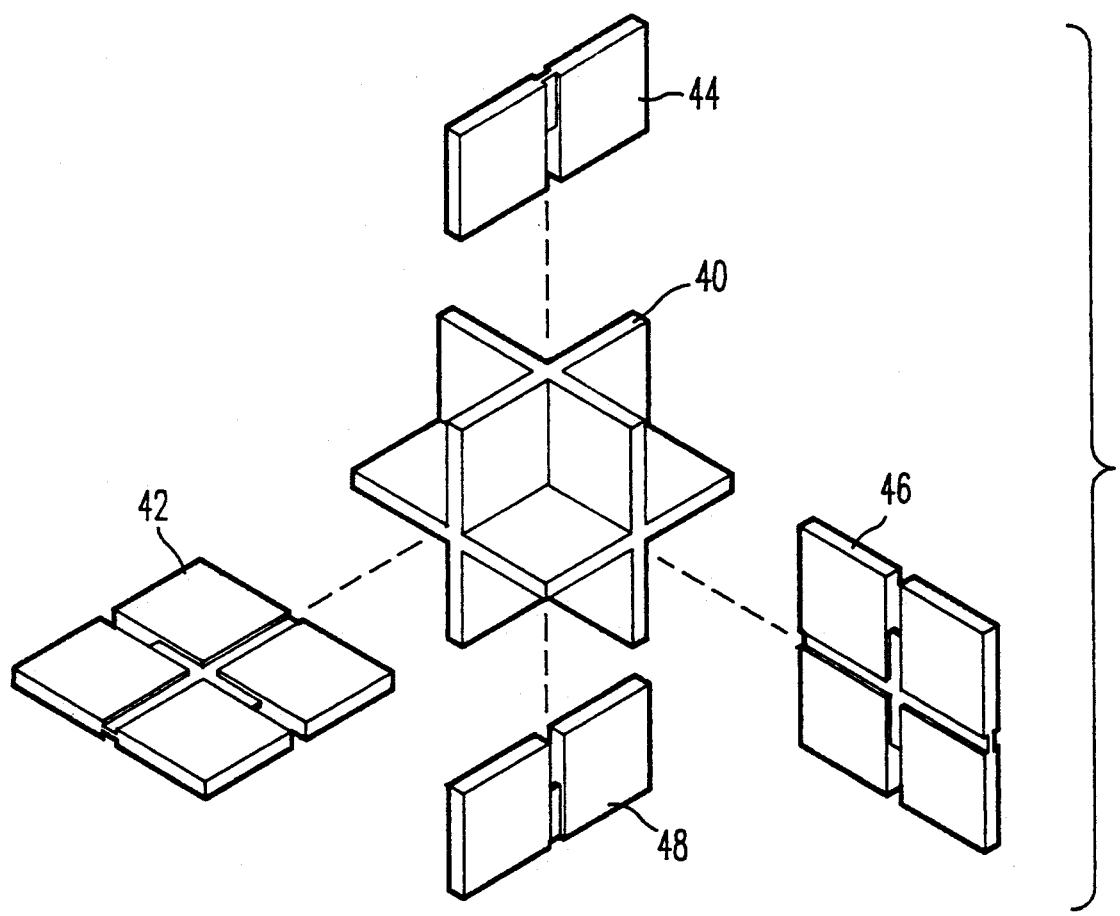
FIG. 4 is an exploded view of the SSA proof mass of the present invention.
Figure 8:
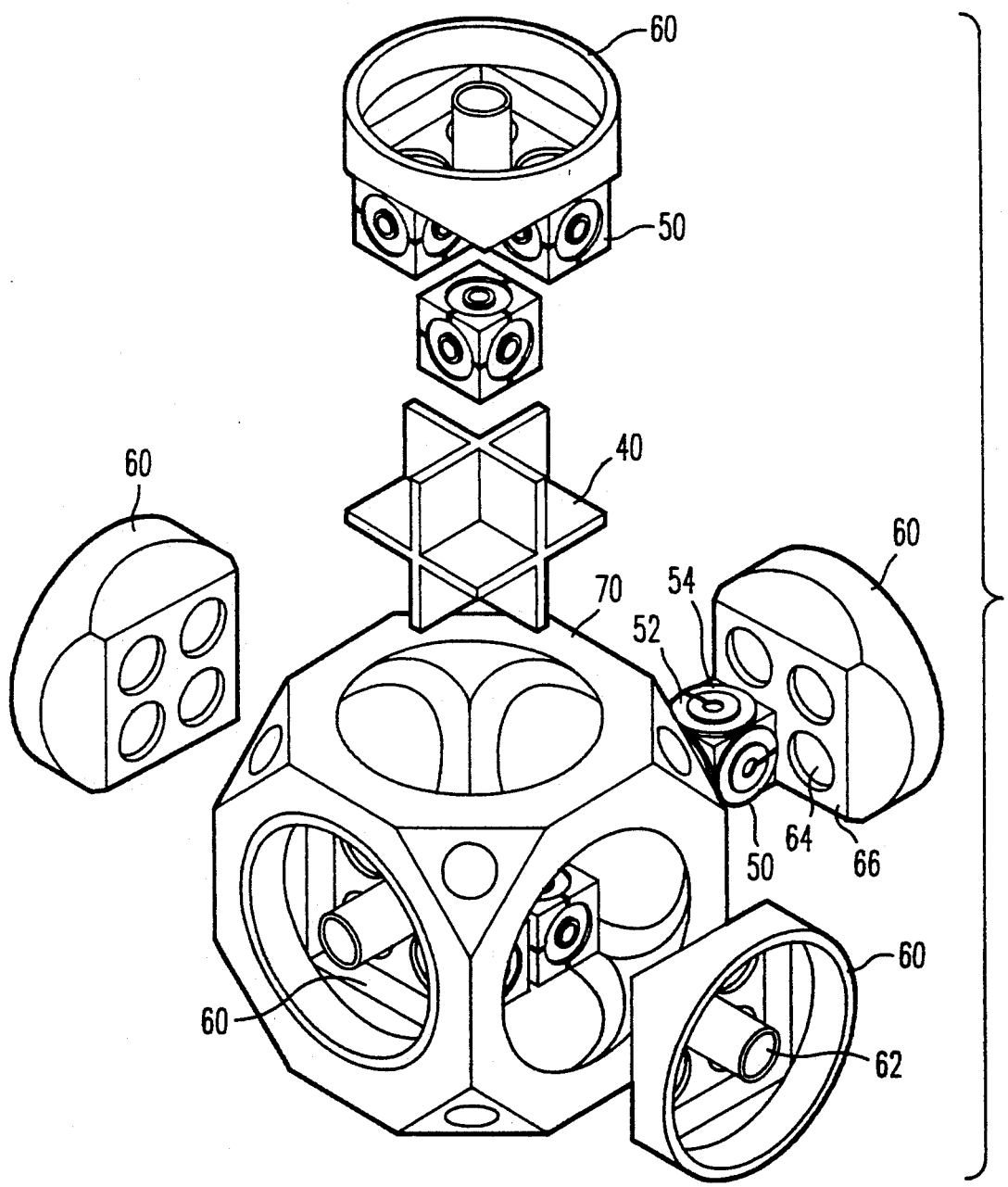
FIG. 8 is an exploded view of the SSA hardware of the present invention.

Referring now to the drawings, wherein like reference numerals designate identical or corresponding parts throughout the several views, and more particularly with respect to FIG. 8 thereof, illustrating an exploded view of the SSA including proof mass 40, coil forms 50, coil form holders 60 and precision mounting cube 70. Proof mass 40 for the SSA is constructed from pure Nb and consists of four separate plates 42, 44, 46 and 48 as shown in FIG. 4. The four separate plates 42, 44, 46 and 48 are cut from a single Nb plate. Each plate is left slightly oversized in order to maintain the precision needed for the final proof mass. After heat treatment in a high vacuum oven at approximately 1800° C. for 4 hours, the plates are then milled to the final dimensions using a computer controlled milling machine. The slots in the plates are finished using an electron discharge machine. The finished plates after being polished are assembled into the final proof mass. Varnish such as GE 7031 (General Electric Company, Schenectady, N.Y.) is used to lock the pieces into place. The proof mass is orthogonal and flat to at least one part in one thousand. The interlocking design of the proof mass avoids the difficult process of machining the proof mass from a single block of Nb.

Figures 5A, 5B:
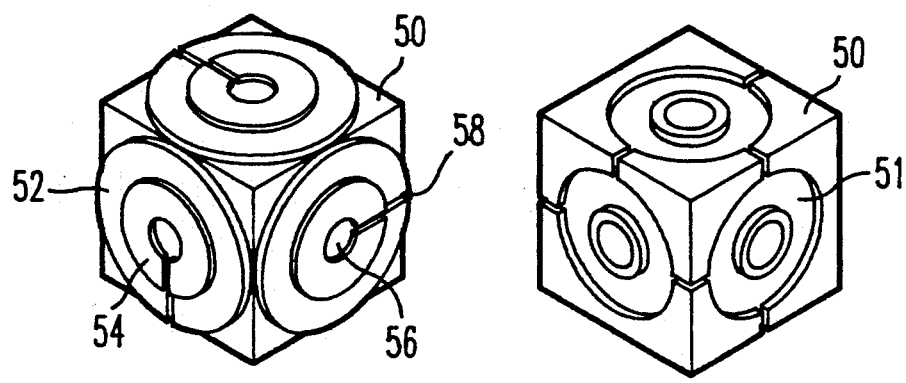
FIG. 5 is an isometric view of one of the coil forms in the SSA of the present invention, depicting the surfaces upon which the superconducting coils are attached and the recessed pocket.

A cubic metallic coil form 50, as shown in FIG. 5, is disposed in each of the eight octants formed by the orthogonal plates of proof mass 40. Each coil form 50 has three surfaces facing the proof mass, each of the surfaces containing one levitation coil and one sensing coil which are attached to concentric circular surfaces 52 and 54.

Figure 12:
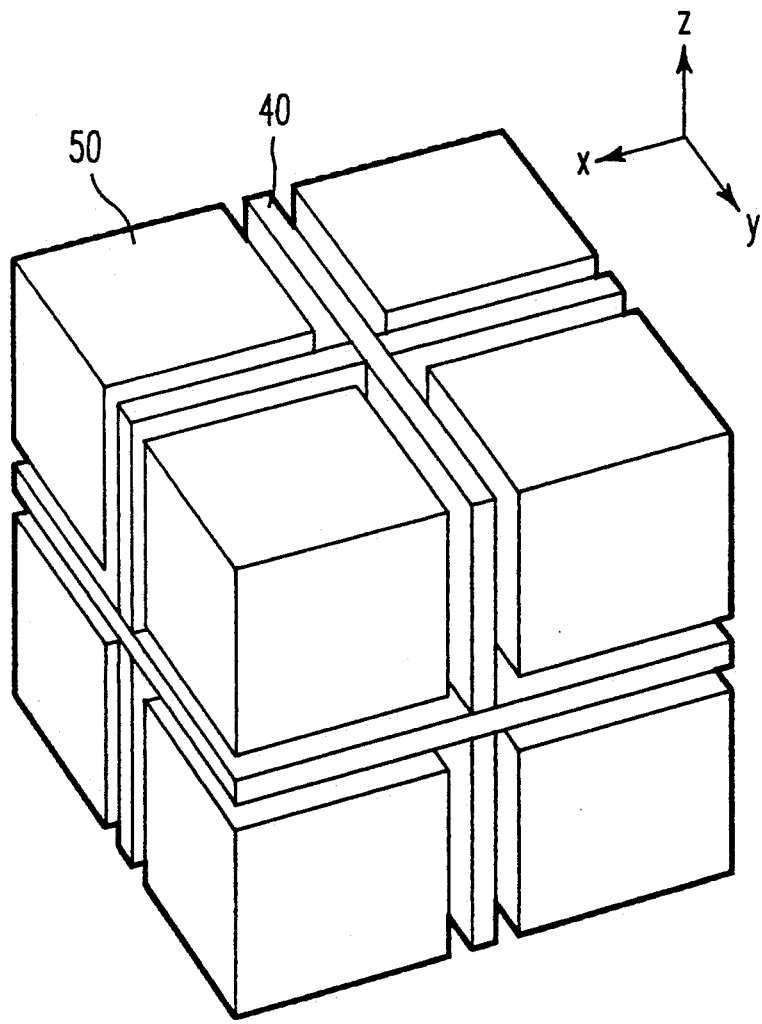
FIG. 12 is a perspective view of the proof mass surrounded by coil forms of the present invention.

A titanium alloy is chosen preferably as a specific material for the coil forms which provides strength and machinability while having a superconducting transition temperature below that of the temperature at which the SSA is operated to prevent the coil forms 50 from becoming superconducting during SSA operation. A conducting coil form also decreases the susceptibility of the superconducting circuitry to RF noise, since eddy current losses in the coil form 50 provide a loss mechanism acting as a high frequency noise filter. FIG. 12 shows proof mass 40 and coil forms 50 positioned in the assembled SSA.

The three faces of the coil form 50 which face away from the proof mass each have a recessed pocket 51 in which small strain relief clamps are mounted to protect the superconducting wires from the superconducting coils mounted on surfaces 52 and 54.

Figure 6:
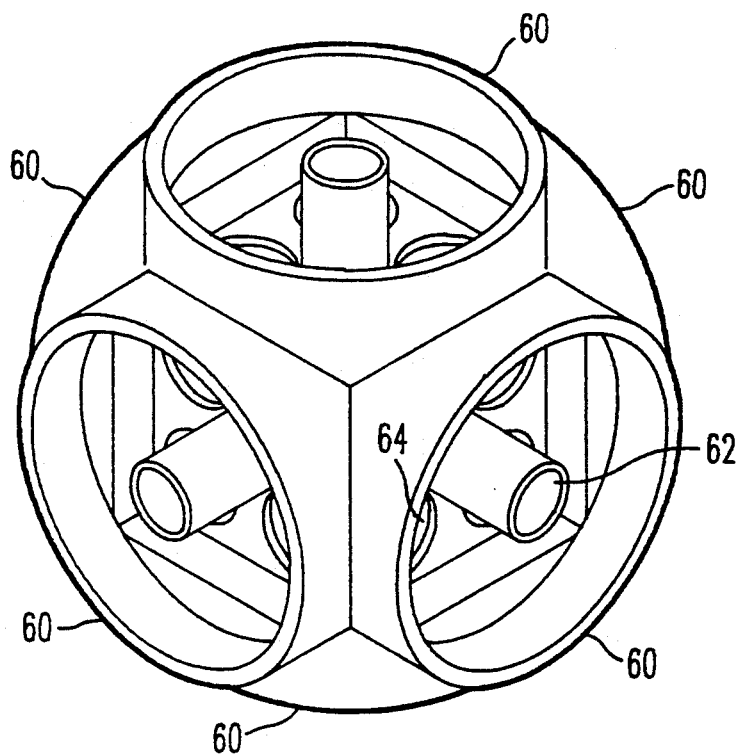
FIG. 6 is a isometric view of the six coil form holders of the present invention.

Referring now to FIG. 8, the sides of coil form 50 which face away from proof mass 40 are attached to coil form holders 60. Coil form holders 60 are made of Nb and are comprised of a substantially rectangular plate 66 with circular apertures 64 disposed at one end of an open cylinder, and smaller cylindrical piece 62 extending from plate 66. Each coil form 50 is attached to three coil form holders 60 and is disposed in the corner of a cubic void formed by the joining of the six coil form holders 60 as illustrated in FIG. 6. Wiring from the superconducting coils mounted on surfaces 52 and 54 of coil form 50 are passed through cylindrical apertures 64. Cylindrical piece 62 houses a feedback transformer.

Figure 7:
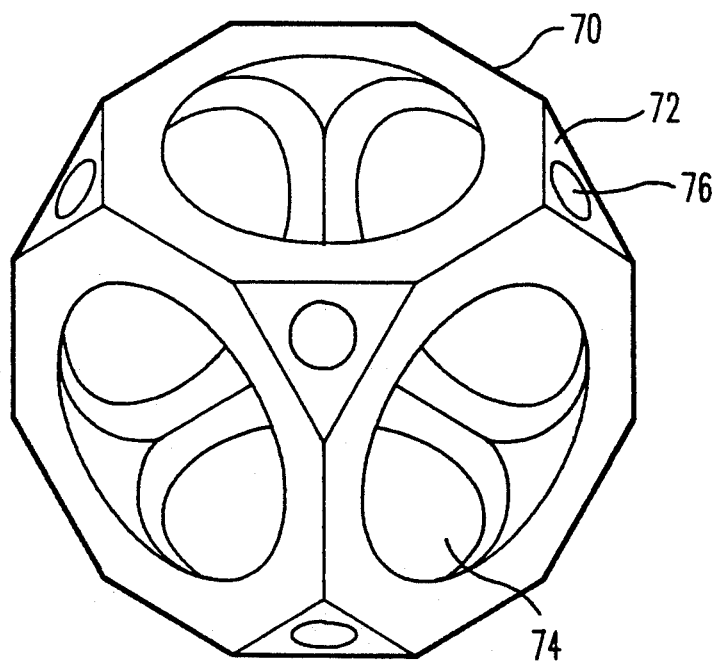
FIG. 7 is an isometric view of the precision mounting cube of the present invention.

The precision mounting cube 70 shown in FIG. 7 houses all the parts of the SSA. Each face of precision mounting cube 70 contains a circular aperture 74 through which coil form holders 60 are inserted. The corners of precision mounting cube 70 have been replaced with a triangular plate 72 which is disposed perpendicular to the triagonal axes of the cube. Each triangular plate 72 contains a circular void 76. One of the plates 72 is used to mount the SSA in the cryostat on the suspension structure while the other seven plates 72 are used to allow passage of current and control leads.

On each surfaces 52 and 54 of coil form 50 facing proof mass 40 are mounted two concentric superconducting coils. The outer coil provides levitation and feedback to proof mass 40 while the inner coil senses the relative motion of proof mass 40. The coils are both spiral pancake coils wound from niobium-titanium (Nb-Ti) superconducting wire. Pure niobium wire is preferred but suffers from a mechanical reliability problem. A total of 48 coils are present in the SSA, 24 used for levitation-feedback and 24 used for sensing.

The Nb-Ti wire is covered by M1 insulation. Before the Nb-Ti wire is wound on coil form 50, the surface of coil form 50 is carefully sanded and cleaned. A clear, highly-polished plexiglass backing plate is placed on top of the coil form and held in place with a bolt through a center hole 56 during the winding process. A small step exists between surfaces 52 and 54 to prevent the backing plate from making contact with the outer coil winding surface 52. Two small hollow teflon tubes are inserted into radial groove 58. The first tube runs from the center of the inner coil and allows the inner coil to be wound after the outer coil is finished. The second tube guides the Nb-Ti wire used for the outer coil.

Winding starts from the center of the outer coil and continues to form a two-layer spiral pancake coil, each coil having 40 turns. A transparent, low viscosity epoxy, such as TRA-CAST BB3002 is used to bond the wire forming the outer coil to coil form surface 52. After the epoxy has set, the center bolt is removed and the backing plate is machined off.

The inner coil is wound after the outer coil is finished. A second clear plexiglass backing plate is mounted on top of the coil form 50. Careful adjustment of the spacing between the backing plate and surface 54 of the coil form 50 matches the gap formed to the diameter of the Nb-Ti wire. Winding begins from the center of the inner coil. Epoxy is again used to bond the inner coil to the coil form surface 52. After the epoxy is set, the backing plate is machined off, leaving a 30 turn pancake spiral coil consisting of a single layer.

Each of the pairs of the wires from the coils are then inserted into the teflon tubes. Each teflon tube is then anchored to a small stress relieving clamp mounted on the adjoining surface of coil form 50 that faces away from proof mass 40. The pairs of wires are then fed through circular apertures 64 of coil form holder 60.

The inductance of a spiral pancake coil next to a superconducting plane has been shown to be:

$$L = L_o + \Lambda r = \Lambda(r_o + r) \quad (1)$$

where $\Lambda = \mu_o A n_r^2$, A is the area of the spiral pancake coil, $r_o$ is the effective spacing of the coil from the superconducting plane, r is displacement of the plane from the center of the coil and $n_r$ is the number of turns per unit length along the radius of the coil.

This expression can be expanded to second order terms, i.e.

$$L = L_o + \Lambda r - \frac{\gamma}{2} r^2 - \frac{\beta}{2} \theta^2 \quad (2)$$

where $\gamma$ and $\beta$ are nonlinear coefficients which describe the change in inductance through second order for displacement r and orientation of the plane with respect to the coil $\theta$. These coefficients are important in determining the resonant frequencies of the SSA.

Knowing the initial position and orientation of each coil allows the computation of the spacing and orientation of each coil with respect to the proof mass. The spacing and orientation, combined with the expanded equation for L, describes the inductance of each coil in the SSA as a function of the position and orientation of the proof mass.

The initial positions of each of the coils in the SSA are described in reference to the proof mass position where d is the distance from the coil to the center of the mass of the proof mass along a direction normal to the surface of the coil, and c is the distance of the coil to the center of mass of the proof mass along a direction parallel to the coil surface.

Each of the coils in the SSA is labeled according to its position with respect to the proof mass coordinate system, as shown in FIG. 12. For example $L_{xy\bar{z}}$ is the inductance of the coil above the x-y plane in the +x, +y quadrant on the −z side of the proof mass. Similarly, $L_{\bar{y}xz}$ is the inductance of the coil above the y-z plane in the −y, +z quadrant on the +x side of the proof mass.

The position of the coils in the SSA are fixed as they are securely attached to coil forms 50 which are held in place by coil form holders 60. The distance from the center of each coil to the adjacent proof mass surface, and the orientation of each coil with respect to the adjacent proof mass surface changes as the position and orientation of the proof mass changes. This change in position of the proof mass forces the inductance of each coil to change since the Meissner effect excludes all magnetic flux from the body of proof mass.

Both the sensing and levitation coils can be described by the same equations but $L_o$, $\Lambda$, $\beta$, $\gamma$ and d are different for the two types of coils and are designated $\Lambda_S$, $\beta_S$, $\gamma_S$ and $d_S$, and $\Lambda_L$, $\beta_L$, $\gamma_L$ and $d_L$ for the sensing and levitation coils, respectively.

The initial position of the coils with respect to the proof mass are given in the following table:

| Coil | x | y | z | Coil | x | y | z | Coil | x | y | z |
|---|---|---|---|---|---|---|---|---|---|---|---|
| $L_{xzy}$ | c | d | c | $L_{xyz}$ | c | c | d | $L_{yzx}$ | d | c | c |
| $L_{x\bar{z}y}$ | c | d | −c | $L_{\bar{x}yz}$ | −c | c | d | $L_{\bar{y}zx}$ | d | −c | c |
| $L_{\overline{xz}y}$ | −c | d | −c | $L_{\overline{xy}z}$ | −c | −c | d | $L_{\overline{yz}x}$ | d | −c | −c |
| $L_{\bar{x}zy}$ | −c | d | c | $L_{x\bar{y}z}$ | c | −c | d | $L_{y\bar{z}x}$ | d | c | −c |
| $L_{xz\bar{y}}$ | c | −d | c | $L_{xy\bar{z}}$ | c | c | −d | $L_{yz\bar{x}}$ | −d | c | c |
| $L_{x\bar{z}\bar{y}}$ | c | −d | −c | $L_{\bar{x}y\bar{z}}$ | −c | c | −d | $L_{\bar{y}z\bar{x}}$ | −d | −c | c |
| $L_{\overline{xz}\bar{y}}$ | −c | −d | −c | $L_{\overline{xy}\bar{z}}$ | −c | −c | −d | $L_{\overline{yz}\bar{x}}$ | −d | −c | −c |
| $L_{\bar{x}z\bar{y}}$ | −c | −d | c | $L_{x\bar{y}\bar{z}}$ | c | −c | −d | $L_{y\bar{z}\bar{x}}$ | −d | c | −c |

With the knowledge of the initial position of each coil to the proof mass, the displacement and orientation of each coil can be calculated. Substituting these values in the second order equation (2) for each coil, the inductance for each coil can be described:

$$L_{xzy} = L_0 + \Lambda[-r_y + c(\theta_x - \theta_z) + c\theta_y\theta_z - r_z\theta_x +$$

$$r_x\theta_z - d(\theta_z^2 + \theta_x^2)/2] - \frac{\gamma}{2}[r_y^2 + c^2(\theta_x - \theta_z)^2 -$$

$$2r_yc(\theta_x - \theta_z)] - \frac{\beta}{2}(\theta_x^2 + \theta_z^2),$$

$$L_{\bar{x}zy} = L_0 + \Lambda[-r_y + c(-\theta_x - \theta_z) - c\theta_z\theta_y - r_z\theta_x +$$

$$r_x\theta_z - d(\theta_x^2 + \theta_z^2)/2] - \frac{\gamma}{2}[r_y^2 + c^2(\theta_x + \theta_z)^2 +$$

-continued $$2r_yc(\theta_x + \theta_z)] - \frac{\beta}{2}(\theta_x^2 + \theta_z^2),$$

$$L_{\bar{x}zy} = L_0 + \Lambda[-r_y + c(-\theta_x + \theta_z) - c\theta_z\theta_y - r_z\theta_x + r_x\theta_z - d(\theta_x^2 + \theta_z^2)/2] - \frac{\gamma}{2}[r_y^2 + c^2(\theta_x - \theta_z)^2 + 2r_yc(\theta_x - \theta_z)] - \frac{\beta}{2}(\theta_x^2 + \theta_z^2),$$

$$L_{\bar{x}zy}^- = L_0 + \Lambda[-r_y + c(\theta_x + \theta_z) + c\theta_z\theta_y - r_z\theta_x + r_x\theta_z - d(\theta_x^2 + \theta_z^2)/2] - \frac{\gamma}{2}[r_y^2 + c^2(\theta_x + \theta_z)^2 - 2r_yc(\theta_x + \theta_z)] - \frac{\beta}{2}(\theta_x^2 + \theta_z^2),$$

$$L_{xzy}^- = L_0 + \Lambda[r_y + c(-\theta_x + \theta_z) - c\theta_z\theta_y + r_z\theta_x - r_x\theta_z - d(\theta_x^2 + \theta_z^2)/2] - \frac{\gamma}{2}[r_y^2 + c^2(\theta_x - \theta_z)^2 - 2r_yc(\theta_x - \theta_z)] - \frac{\beta}{2}(\theta_x^2 + \theta_z^2),$$

$$L_{xzy}^- = L_0 + \Lambda[r_y + c(\theta_x + \theta_z) + c\theta_z\theta_y + r_z\theta_x - r_x\theta_z - d(\theta_x^2 + \theta_z^2)/2] - \frac{\gamma}{2}[r_y^2 + c^2(\theta_x + \theta_z)^2 + 2r_yc(\theta_x - \theta_z)] - \frac{\beta}{2}(\theta_x^2 + \theta_z^2),$$

$$L_{\overline{xz}y} = L_0 + \Lambda[r_y + c(\theta_x - \theta_z) + c\theta_z\theta_y + r_z\theta_x - r_x\theta_z - d(\theta_x^2 + \theta_z^2)/2] - \frac{\gamma}{2}[r_y^2 + c^2(\theta_x - \theta_z)^2 + 2r_yc(\theta_x - \theta_z)] - \frac{\beta}{2}(\theta_x^2 + \theta_z^2),$$

$$L_{\overline{xz}y}^- = L_0 + \Lambda[r_y + c(-\theta_x - \theta_z) - c\theta_z\theta_y + r_z\theta_x - r_x\theta_z - d(\theta_x^2 + \theta_z^2)/2] - \frac{\gamma}{2}[r_y^2 + c^2(\theta_x + \theta_z)^2 - 2r_yc(\theta_x + \theta_z)] - \frac{\beta}{2}(\theta_x^2 + \theta_z^2),$$

$$L_{xyz} = L_0 + \Lambda[-r_z + c(\theta_y - \theta_x) - r_x\theta_y + r_y\theta_x - d(\theta_x^2 + \theta_y^2)/2] - \frac{\gamma}{2}[r_z^2 + c^2(\theta_x - \theta_y)^2 + 2r_zc(\theta_x - \theta_y)] - \frac{\beta}{2}(\theta_x^2 + \theta_y^2),$$

$$L_{\bar{x}yz} = L_0 + \Lambda[-r_z + c(-\theta_y - \theta_x) - r_x\theta_y + r_y\theta_x - d(\theta_x^2 + \theta_y^2)/2] - \frac{\gamma}{2}[r_z^2 + c^2(\theta_x + \theta_y)^2 + 2r_zc(\theta_x + \theta_y)] - \frac{\beta}{2}(\theta_x^2 + \theta_y^2),$$

$$L_{x\bar{y}z} = L_0 + \Lambda[-r_z + c(-\theta_y + \theta_x) - r_x\theta_y + r_y\theta_x - d(\theta_x^2 + \theta_y^2)/2] - \frac{\gamma}{2}[r_z^2 + c^2(\theta_x - \theta_y)^2 - 2r_zc(\theta_x - \theta_y)] - \frac{\beta}{2}(\theta_x^2 + \theta_y^2),$$

$$L_{xy\bar{z}} = L_0 + \Lambda[r_z + c(-\theta_y + \theta_x) + r_x\theta_y - r_y\theta_x - d(\theta_x^2 + \theta_y^2)/2] - \frac{\gamma}{2}[r_z^2 + c^2(\theta_x - \theta_y)^2 + 2r_zc(\theta_x - \theta_y)] - \frac{\beta}{2}(\theta_x^2 + \theta_y^2),$$

$$L_{\bar{x}y\bar{z}} = L_0 + \Lambda[r_z + c(\theta_y + \theta_x) + r_x\theta_y - r_y\theta_x - d(\theta_x^2 + \theta_y^2)/2] - \frac{\gamma}{2}[r_z^2 + c^2(\theta_x + \theta_y)^2 + 2r_zc(\theta_x + \theta_y)] - \frac{\beta}{2}(\theta_x^2 + \theta_y^2),$$

$$L_{\overline{xy}z} = L_0 + \Lambda[r_z + c(\theta_y - \theta_x) + r_x\theta_y - r_y\theta_x - d(\theta_x^2 + \theta_y^2)/2] - \frac{\gamma}{2}[r_z^2 + c^2(\theta_x - \theta_y)^2 - 2r_zc(\theta_x - \theta_y)] - \frac{\beta}{2}(\theta_x^2 + \theta_y^2),$$

$$L_{x\bar{y}\bar{z}} = L_0 + \Lambda[r_z + c(-\theta_y - \theta_x) + r_x\theta_y - r_y\theta_x - d(\theta_x^2 + \theta_y^2)/2] - \frac{\gamma}{2}[r_z^2 + c^2(\theta_x + \theta_y)^2 - 2r_zc(\theta_x + \theta_y)] - \frac{\beta}{2}(\theta_x^2 + \theta_y^2),$$

$$L_{yzx} = L_0 + \Lambda[-r_x + c(\theta_z - \theta_y) - c(\theta_y\theta_x + \theta_z\theta_x) - r_y\theta_z + r_z\theta_y - d(\theta_y^2 + \theta_z^2)/2] - \frac{\gamma}{2}[r_x^2 + c^2(\theta_y - \theta_z)^2 + 2r_xc(\theta_y - \theta_z)] - \frac{\beta}{2}(\theta_y^2 + \theta_z^2),$$

$$L_{\bar{y}zx} = L_0 + \Lambda[-r_x - c(\theta_z + \theta_y) + c(\theta_z\theta_x - \theta_y\theta_x) - r_y\theta_z + r_z\theta_y - d(\theta_y^2 + \theta_z^2)/2] - \frac{\gamma}{2}[r_x^2 + c^2(\theta_y + \theta_z)^2 + 2r_xc(\theta_y + \theta_z)] - \frac{\beta}{2}(\theta_y^2 + \theta_z^2),$$

$$L_{y\bar{z}x} = L_0 + \Lambda[-r_x + c(\theta_y - \theta_z) - c(\theta_y\theta_x + \theta_z\theta_x) - r_y\theta_z + r_z\theta_y - d(\theta_y^2 + \theta_z^2)/2] - \frac{\gamma}{2}[r_x^2 + c^2(\theta_y - \theta_z)^2 - 2r_xc(\theta_y - \theta_z)] - \frac{\beta}{2}(\theta_y^2 + \theta_z^2),$$

$$L_{\bar{y}zx} = L_0 + \Lambda[-r_x + c(\theta_z + \theta_y) + c(\theta_y\theta_x - \theta_z\theta_x) - r_y\theta_z + r_z\theta_y - d(\theta_y^2 + \theta_z^2)/2] - \frac{\gamma}{2}[r_x^2 + c^2(\theta_y + \theta_z)^2 - 2r_xc(\theta_y + \theta_z)] - \frac{\beta}{2}(\theta_y^2 + \theta_z^2),$$

$$L_{yz\bar{x}} = L_0 + \Lambda[r_x + c(\theta_y - \theta_z) - c(\theta_y\theta_x + \theta_z\theta_x) + r_y\theta_z - r_z\theta_y - d(\theta_y^2 + \theta_z^2)/2] - \frac{\gamma}{2}[r_x^2 + c^2(\theta_y - \theta_z)^2 + 2r_xc(\theta_y - \theta_z)] - \frac{\beta}{2}(\theta_y^2 + \theta_z^2),$$

$$L_{\bar{y}z\bar{x}} = L_0 + \Lambda[r_x + c(\theta_z + \theta_y) + c(\theta_y\theta_x - \theta_z\theta_x) + r_y\theta_z - r_z\theta_y - d(\theta_y^2 + \theta_z^2)/2] - \frac{\gamma}{2}[r_x^2 + c^2(\theta_y + \theta_z)^2 +$$

-continued $$2r_x c(\theta_y + \theta_z)] - \frac{\beta}{2}(\theta_y^2 + \theta_z^2),$$

$$L_{\overline{yzx}} = L_0 + \Lambda[r_x + c(\theta_z - \theta_y) + c(\theta_y\theta_x + \theta_z\theta_x) +$$

$$r_y\theta_z - r_z\theta_y - d(\theta_y^2 + \theta_z^2)/2] - \frac{\gamma}{2}[r_x^2 + c^2(\theta_y - \theta_z)^2 -$$

$$2r_x c(\theta_y - \theta_z)] - \frac{\beta}{2}(\theta_y^2 + \theta_z^2),$$

$$L_{y\overline{zx}} = L_0 + \Lambda[r_x - c(\theta_z + \theta_y) + c(\theta_z\theta_x - \theta_y\theta_x) +$$

$$r_y\theta_z - r_z\theta_y - d(\theta_y^2 + \theta_z^2)/2] - \frac{\gamma}{2}[r_x^2 + c^2(\theta_y + \theta_z)^2 -$$

$$2r_x c(\theta_y + \theta_z)] - \frac{\beta}{2}(\theta_y^2 + \theta_z^2),$$

Superconducting joints used to connect two or more Nb-Ti wires are formed by spot welding the wires to Nb-Ti foil. Two small teflon tubes are mounted at one end of a piece of Nb-Ti foil to keep the wire from bending at the spot weld and to provide strain relief. Before the spot weld is formed, each wire is crushed flat to approximately one-half its original diameter, increasing the surface area of the wire in contact with the foil. Both the Nb-Ti wires and the Nb-Ti foil are polished in a diluted solution of equal parts 85% $H_3PO_4$, 70% $HNO_3$, and 49% HF, and cleaned with distilled water to remove any residual acid. The contact pressure and energy settings of the spot welder are adjusted such that a clear fusion of the wire and the foil with little or no evaporation of material results. Superconducting joints formed in this manner consistently carry critical currents in access of 8 amperes through many thermal cycles.

Superconducting feedback transformers are mounted inside cylindrical piece 62 of coil form holder 60. The transformers are cylindrical with a thin brass layer separating the primary and secondary windings. The brass layer forms a barrier to high frequency interference and allows the feedback electronics to be directly connected to the SSA.

Figure 9A:
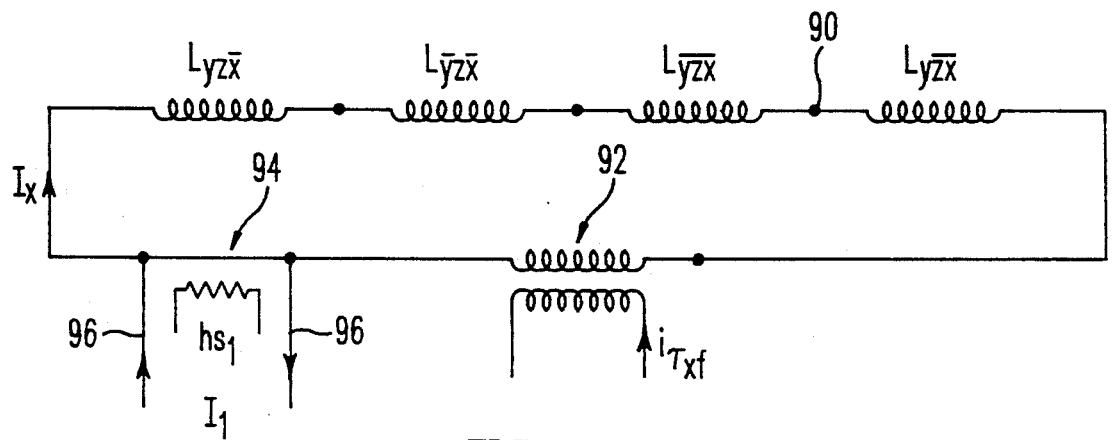
FIGS. 9a and 9b are schematic circuit diagrams of the $r_x$ and $r_\theta$ levitation-feedback circuitry, respectively of the present invention.

Shielded heat switches hs1-hs3 are made from $\frac{1}{8}$ W, 500 ohm carbon resistors. The carbon resistors should be chosen to have a resistance which increases dramatically as liquid helium temperatures are approached. Heat switches hs1-hs3 provide passive feedback when driven by a current source represented in FIG. 9A as $I_1$. Each resistor is insulated and surrounded by a thin layer of lead foil which is then soldered to lead tubing which contains the leads that attach to the resistor. The shielding acts to prevent RF interference from entering the superconducting circuitry through the heat switch leads.

A Nb-Ti wire is folded in half and wound non-inductively around the heat shielded resistor and secured in place with a small amount of varnish. The completed heat switch is attached to a small copper block containing a round copper post tinned with solder. The Nb-Ti wire wound around the lead shield is then wound several times around the copper post and held in place with additional varnish. The copper post serves as a heat sink and insures that the only portion of the superconducting circuitry that is warmed above the superconducting transition temperature is the Nb-Ti wire directly in contact with the heat switch. The shielded heat switches hs1-hs3 are mounted inside the coil form holders 60. In total, 16 heat switches are used in the SSA.

The SSA is oriented in the "umbrella orientation", such that all three sensitive axes make the same angle with a vertical plane. This orientation has the advantage of distributing the pull of gravity equally among the three axes.

The levitation circuits must each equally levitate the proof mass in the presence of gravity. The levitation-feedback circuit will be described in reference to FIG. 9A for the x degree of freedom. The four levitation coils are located beneath the x plane of the proof mass 40. A current $I_x$ stored in the levitation circuit loop causes the four coils to push upwardly on the proof mass equally. Transformer 92 allows current to be subtracted or added to the stored current $I_x$ to raise or lower the proof mass position. The feedback transformer 92 also provides a feedback current to maintain the proof mass in the null position when an acceleration is applied.

The storage of a persistent current $I_x$ in the superconducting loop is performed as follows. Initially, there is no current stored in the loop. The external current leads 96 are then driven with a steady current represented as $I_1$ of approximately 0.5 A. At this point, all of $I_1$ is passing through heat switch hs1. Heat switch hs1 is then pulsed on for approximately 40 milliseconds. The short path 94 between the two superconducting joints are driven normal, forcing a current to flow through the four inductors which levitate the proof mass in the x direction. Approximately 10 milliseconds after the current driving heat switch hs1 is removed, heat switch hs1 becomes superconducting, trapping current in the x direction levitation-feedback loop. This process is repeated until the desired amount of flux is trapped in the x degree of freedom levitation-feedback circuit.

Current leads 96 are preferably constructed from copper clad Nb-Ti wire. The copper cladding reduces the risk of driving the current supply leads normal, and provides additional heat capacity protecting leads 96. A programmable current supply (not shown) supplies external current to current leads 96. If any portion of the superconducting circuit is driven normal while storing currents, the external current supply could possibly damage the superconducting circuitry. In order to prevent such damage, an automatic protection circuit monitors the voltage across the current supply leads 96. Any voltage signal exceeding a preset voltage threshold shunts the external current supply.

Figure 9B:
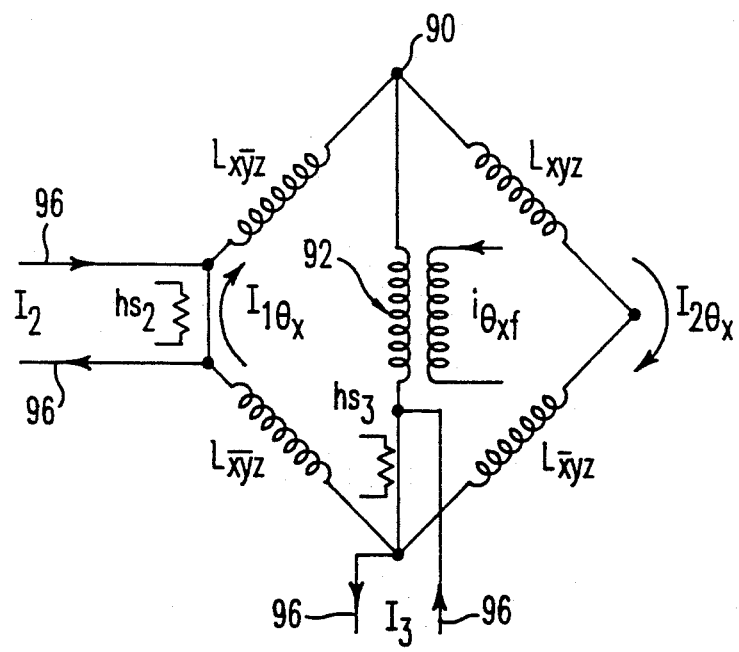

The $\theta_x$ levitation-feedback circuit is shown in FIG. 9B. The circuit contains four levitations coils and one feedback transformer 92. Each set of four levitation coils is mounted on the upper side of one of the proof mass planes. In the case of the $\theta_x$ circuit, the four levitation coils are mounted on the positive side of the plate of proof mass 40 defining the z axis.

Two separate currents are stored in each of the two superconducting loops in the angular circuits. The current in the left loop, $I_{1\theta x}$, rotates proof mass 40 about the x axis in a counterclockwise manner. The current in the right loop, $I_{2\theta x}$, rotates proof mass 40 about the x axis in the clockwise manner. A feedback transformer 92 is provided so that the angular position of the proof mass can be adjusted. If the same current is stored in each of the two loops of the $\theta_x$ levitation-feedback circuit, then any additional current added by the feedback transformer will tend to decrease one current and increase the other, applying a torque to the proof mass 40.

Initialization of the stored currents in the $\theta_x$ levitation-feedback circuits is performed as follows. The $\theta_x$ circuit contains two heat switches, hs2 and hs3, two pairs of current supply leads 96 allowing the introduction of currents $I_2$ and $I_3$, and feedback transformer 92. Initially, current is stored about the outer loop of the circuit. This is performed by pulsing heat switches hs2 and hs3 while supplying current $I_2$ through current leads 96. Flux is trapped in the circuit such that $I_2 = I_{1\theta x} = I_{2\theta x}$, applying an even downward force on the proof mass in the $-z$ direction. If heat switch hs3 is pulsed and current $I_3$ is applied through current leads 96, the current trapped in each side of the circuit will be such that $I_{1\theta x} = I_2 - I_3/2$, and $I_{2\theta x} = I_2 + I_3/2$. This current imbalance applies a torque about the x axis of proof mass 40. The current $I_3$ is used to apply a small torque to proof mass 40 which balances the $\theta_x$ sensing bridge.

Similar y and z direction levitation-feedback circuits are provided, with the levitation coils located beneath the y axis plate and the z axis plate of proof mass 40, respectively. $\theta_y$ and $\theta_z$ levitation-feedback circuits are also provided, with the levitation coils mounted in the x and y planes respectively.

Figure 10:
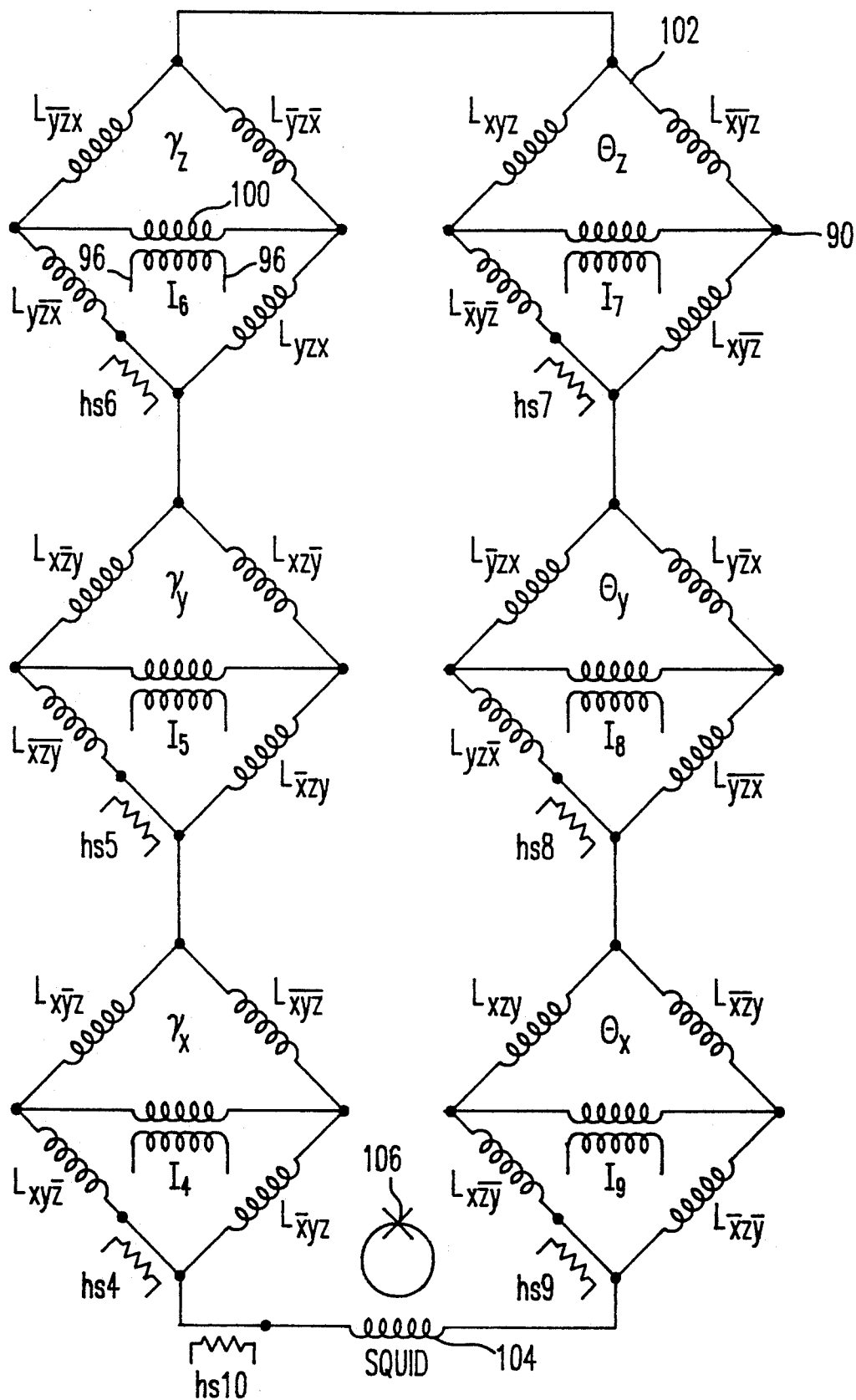
FIG. 10 is a schematic circuit diagram of the sensing circuitry of the present invention.

The superconducting sensing circuit used in the SSA is shown in FIG. 10, with heat switches hs4–hs9, driving current transformers 100 and six inductance bridges 102 each containing four sensing coils. An additional heat switch, hs10, discharges any flux that may be trapped in the superconducting loop containing the SQUID input coil 104. Heat switch hs10 also protects SQUID 106 from any input current spikes induced in the sensing circuitry while currents are being stored in the levitation circuitry.

All leads extending from the sensing inductances are of equal length, and both sides of each sensing bridge are identical up to the small inductance added by each heat switch. Symmetry is extremely important as any asymmetry in the sensing circuitry will generate stray inductance which can imbalance the sensing bridge 102. Balancing an asymmetric sensing bridge will displace the proof mass away from equilibrium position. In the present embodiment, heat switches hs4–hs9 lie on only one side of each bridge 102. It is possible, however to construct an eight wire heat switch which would present a symmetrical set of stray inductances to the sensing bridges 102.

The six sets of current leads 96 allow the introduction of currents $I_4$–$I_9$, and are driven by six room temperature oscillators (not shown). A polystyrene capacitor (not shown) is connected across the primary of each transformer 100 to form a tank circuit. The tank circuit strongly attenuates noise above its resonant frequency and, when driven at resonance, increases the driving current through the inductance bridge. The capacitors are selected such that each tank circuit resonates at a different frequency. The lowest frequency tank circuit resonates at 500 Hz, the highest at a frequency of 2500 Hz with equal spacing of 400 Hz separating the oscillators.

The amplifying function of the tank circuit when driven at resonance allows a smaller current to be fed through the current leads connecting the tank circuit with the external current source. Thus, less heating of the current leads occurs, resulting in greater temperature stability and more efficient operation of the SSA due to the reduced liquid helium loss.

The output of the SQUID amplifier is high pass filtered and fed into six separate lock-in amplifiers such as Model 3961B, Ithaco Incorporated. Each lock-in amplifier is tuned to one of the six tank circuit resonant frequencies. One of the six separately modulated signals is demodulated and recovered at the output of each lock-in amplifier. The lock-in amplifiers are not shown for simplicity.

Figure 11:
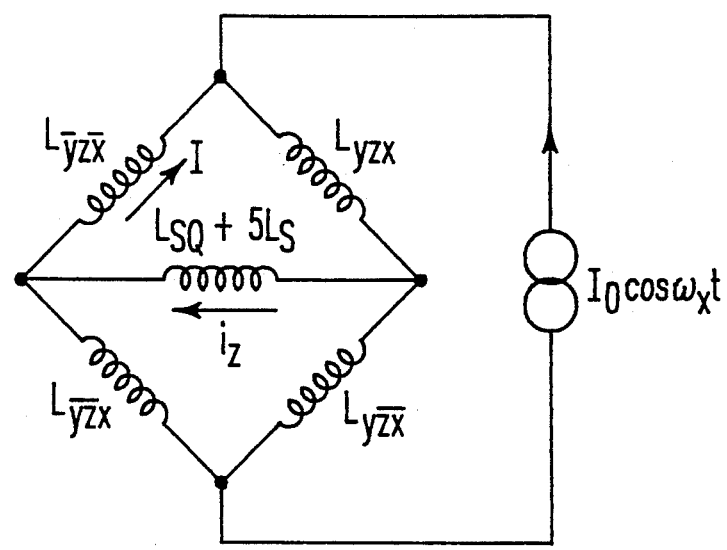
FIG. 11 is a schematic circuit diagram of a simplified superconducting sensing circuit for the $r_x$ degree of freedom of the present invention.

The operation of the sensing circuitry can be more simply understood with reference to FIG. 11. The sensing circuit for the x degree of freedom in this simplified form contains two independent superconducting loops about which the trapped flux must remain constant. As the initial flux is 0, two flux conservation equations may be written. These equations correspond to the above-mentioned equations (3) and (4). Substituting in these equations for $L_{\bar{y}\bar{z}\bar{x}}$, $L_{\bar{y}z x}$, $L_{y\bar{z}x}$ and $L_{yzx}$ after solving for the current $i_{rx}$ which is the current through the SQUID amplifier, previously mentioned equation (5) after expanding to second order in r and $\theta$ results. It is thus apparent that $i_{rx}$ is directly proportional to the position of the accelerometer in the x direction.

Similar analysis can be carried out for the y, z, $\theta_x$, $\theta_y$ and $\theta_z$ degrees of freedom.

Each sensing circuit will affect the dynamics of the proof mass 40. As the proof mass 40 changes position with respect to the bridge inductances, the currents flowing through the sensing circuits must redistribute. This change in current redistributes the stored energy in the sensing bridge and changes the magnetic potential energy. As the amount of sensing current is increased, the stiffness of the magnetic spring surrounding the proof mass is increased.

The potential energy of the sensing circuit is:

$$V_{rx} = E - I_o \cos \omega_{rx} t [L_{yzx}(I + I_o \cos \omega_{rx} t) + L_{\bar{y}\bar{z}\bar{x}}(I + I_o \cos \omega_{rx} t - i_{rx})]$$

Substituting for I, $i_{rx}$, $L_{\bar{y}z\bar{x}}$, $L_{y\bar{z}x}$, $L_{yzx}$ and $L_{\bar{y}zx}$, and expanding to second order in r and $\theta$, the following equation results:

$$V_{rx} = \frac{1}{4} I_o^2 (1 + \cos 2\omega_{rx} t) \Bigg[ -L_S + \left( \frac{\Lambda_S^2}{L_{SQ} + 6L_S} + \frac{\gamma_S}{2} \right) r_x^2 + \left( \frac{c^2 \Lambda_S^2}{L_S} \right) \theta_y^2 + \frac{1}{2} (\Lambda_S d_S + c^2 \gamma_S + \beta_S)(\theta_y^2 + \theta_x^2) \Bigg].$$

Similar equations can be written for the $r_y$, $r_z$, $\theta_x$, $\theta_y$ and $\theta_z$ potential energies.

It is desirable to separate the effects of the linear and angular sensing circuits by driving each with a different magnitude of oscillating current. Thus, all three linear circuits will be driven with an oscillating current of magnitude $I_r$, and all three angular circuits will be driven with an oscillating current of magnitude $I_\theta$. The potential derived from all six sensing circuits, $V_S$, is then $$V_S = -\frac{3}{4} (I_r^2 + I_\theta^2) L_S +$$

$$\frac{1}{4} \left[ I_r^2 \frac{\Lambda_S^2}{L_{SQ} + 6L_S} + (I_r^2 + I_\theta^2) \frac{\gamma_S}{2} \right] (r_x^2 + r_y^2 + r_z^2) +$$

-continued $$\frac{1}{4}\left[(I_r^2 + I_\theta^2)\left(\frac{c^2\Lambda_S^2}{L_S} + \Lambda_S d_S + c^2\gamma_S + \beta_S\right) + \right.$$

$$\left. I_\theta^2 \frac{c^2\Lambda_S^2}{L_{SQ} + 6L_S}\right](\theta_x^2 + \theta_y^2 + \theta_z^2).$$

The complete potential for the SSA is, substituting $I_+$ and $I_-$ for the linear and angular current stored in the levitation circuits, respectively:

$$V = V_L + V_S = V_o + 2(I_-^2 - I_+^2)\Lambda_L(r_x + r_y + r_z) +$$

$$2(I_-^2 - I_+^2)\Lambda_L[\theta_x(r_z - r_y) + \theta_y(r_x - r_z) + \theta_z(r_y - r_x)] +$$

$$2\left[I_-^2 \frac{\Lambda_L^2}{L_L} + I_+^2\left(\frac{4\Lambda_L^2}{4L_L + L} + \frac{\gamma_L}{2}\right)\right](r_x^2 + r_y^2 + r_z^2) +$$

$$\frac{1}{4}\left[I_r^2 \frac{\Lambda_S^2}{L_{SQ} + 6L_S} + (I_r^2 + I_\theta^2)\frac{\gamma_S}{2}\right](r_x^2 + r_y^2 + r_z^3) +$$

$$\left[2(I_+^2 + I_-^2)(\Lambda_L d_L + c^2\gamma_L + \beta_L) + \right.$$

$$\left. 2I_-^2 \frac{c^2\Lambda_L^2}{L_L + L}\right](\theta_x^2 + \theta_y^2 + \theta_z^2) +$$

$$\frac{1}{4}\left[(I_r^2 + I_\theta^2)\left(\frac{c^2\Lambda_S^2}{L_S} + \Lambda_S d_s + c^2\gamma_S + \beta_S\right) + \right.$$

$$\left. I_\theta^2 \frac{c^2\Lambda_S^2}{L_{SQ} + 6L_S}\right](\theta_x^2 + \theta_y^2 + \theta_z^2),$$

where $$V_o = \frac{3}{2}(4L_L + L)I_+^2 + 6I_-^2 L_L - \frac{3}{4}(I_r^2 + I_\theta^2)L_S.$$

We can rewrite the potential V, by defining:

$$f_{DC} = 2(I_+^2 - I_-^2)\Lambda_L,$$

$$k_s = \frac{1}{2}\left[I_r^2 \frac{\Lambda_S^2}{L_{SQ} + 6L_S} + (I_r^2 + I_\theta^2)\frac{\gamma_S}{2}\right],$$

$$k_L = 4\left[I_-^2 \frac{\Lambda_L^2}{L_L} + I_+^2\left(\frac{4\Lambda_L^2}{4L_L + L} + \frac{\gamma_L}{2}\right)\right],$$

$$\tau_L = 4\left[(I_+^2 + I_-^2)(\Lambda_L d_L + c^2\gamma_L + \beta_L) + I_-^2 \frac{c^2\Lambda_L^2}{L_L + L}\right],$$

$$\tau_S = \frac{1}{2}\left\{(I_r^2 + I_\theta^2)\left[\frac{c^2\Lambda_S^2}{L_S} + \Lambda_S d_S + c^2\gamma_S + \beta_S\right] + \right.$$

$$\left. I_\theta^2 \frac{c^2\Lambda_S^2}{L_{SQ} + 6L_S}\right\}.$$

We find, after substituting the above expressions into V, $$V = V_o - f_{DC}(r_x + r_y + r_z) - f_{DC}[\theta_x(r_z - r_y) + \theta_y(r_x - r_z) +$$

$$\theta_z(r_y - r_x)] + \frac{1}{2}(k_L + k_S)(r_x^2 + r_y^2 + r_z^2) +$$

$$\frac{1}{2}(\tau_L + \tau_S)(\theta_x^2 + \theta_y^2 + \theta_z^2).$$

Each portion of the potential contributes to the dynamics of the SSA: $k_L$ and $k_S$ are the linear spring constants generated by the levitation and sensing circuitry, $\tau_L$ and $\tau_S$ are the angular spring constants generated by the levitation and sensing circuitry, $f_{DC}$ is the DC force generated by the levitation circuitry, and $f_{DC}$ is also a measure of the cross coupling between the linear and angular levitation circuits.

The transfer function relating acceleration to displacement and displacement to output current will now be described. A displacement of the proof mass 40 in the SSA away from equilibrium results in a current i at the input coil of the SQUID amplifier. The six transfer functions relating the output current of the SSA to the position and orientation of the proof mass 40 are:

$$H_{rxi} = \frac{i_x}{r_x} = I_r \cos\omega_{rx} t \frac{\Lambda_S}{L_{SQ} + 6L_S},$$

$$H_{ryi} = \frac{i_y}{r_y} = I_r \cos\omega_{ry} t \frac{\Lambda_S}{L_{SQ} + 6L_S},$$

$$H_{rzi} = \frac{i_z}{r_z} = I_r \cos\omega_{rz} t \frac{\Lambda_S}{L_{SQ} + 6L_S},$$

$$H_{\theta xi} = \frac{i_{\theta x}}{\theta_x} = I_\theta \cos\omega_{\theta x} t \frac{c\Lambda_S}{L_{SQ} + 6L_S},$$

$$H_{\theta yi} = \frac{i_{\theta y}}{\theta_y} = I_\theta \cos\omega_{\theta y} t \frac{c\Lambda_S}{L_{SQ} + 6L_S},$$

$$H_{\theta zi} = \frac{i_{\theta z}}{\theta_z} = I_\theta \cos\omega_{\theta z} t \frac{c\Lambda_S}{L_{SQ} + 6L_S},$$

where all second order terms have been dropped.

An acceleration of the SSA is echoed by a displacement of proof mass 40. Taking into account that the SSA is oriented in the umbrella orientation and the damping of the motion of the proof mass, the transfer functions relating acceleration to displacement can be written as follows:

$$H_{ax} = \frac{r_x(\omega)}{a_x(\omega)} = \frac{1}{\omega_r^2 + i\omega_r\omega/Q_r - \omega^2},$$

$$H_{ay} = \frac{r_y(\omega)}{a_y(\omega)} = \frac{1}{\omega_r^2 + i\omega_r\omega/Q_r - \omega^2},$$

$$H_{az} = \frac{r_z(\omega)}{a_z(\omega)} = \frac{1}{\omega_r^2 + i\omega_r\omega/Q_r - \omega^2},$$

$$H_{a\theta x} = \frac{\theta_x(\omega)}{a_x(\omega)} = \frac{1}{\omega_\theta^2 + i\omega_\theta\omega/Q_\theta - \omega^2},$$

$$H_{a\theta y} = \frac{\theta_y(\omega)}{a_y(\omega)} = \frac{1}{\omega_\theta^2 + i\omega_\theta\omega/Q_\theta - \omega^2},$$

$$H_{a\theta z} = \frac{\theta_z(\omega)}{a_z(\omega)} = \frac{1}{\omega_\theta^2 + i\omega_\theta\omega/Q_\theta - \omega^2}.$$

Combining the equations for the transfer functions relating acceleration to displacement and equation relating output current of the SSA to the position and orientation of proof mass 40, the transfer functions relating acceleration to output current can be written.

$$H_{axi} = \frac{i_x(\omega)}{a_x(\omega)} = I_r \cos\omega_{rx}t \frac{\Lambda_S}{L_{SQ} + 6L_S} \frac{1}{\omega_r^2 + i\omega_r\omega/Q_r - \omega^2},$$

$$H_{ayi} = \frac{i_y(\omega)}{a_y(\omega)} = I_r \cos\omega_{ry}t \frac{\Lambda_S}{L_{SQ} + 6L_S} \frac{1}{\omega_r^2 + i\omega_r\omega/Q_r - \omega^2},$$

$$H_{azi} = \frac{i_z(\omega)}{a_z(\omega)} = I_r \cos\omega_{rz}t \frac{\Lambda_S}{L_{SQ} + 6L_S} \frac{1}{\omega_r^2 + i\omega_r\omega/Q_r - \omega^2},$$

$$H_{\alpha xi} = \frac{i_{\theta x}(\omega)}{a_x(\omega)} = I_\theta \cos\omega_{\theta x}t \frac{c\Lambda_S}{L_{SQ} + 6L_S} \frac{1}{\omega_\theta^2 + i\omega_\theta\omega/Q_\theta - \omega^2},$$

$$H_{\alpha yi} = \frac{i_{\theta y}(\omega)}{a_y(\omega)} = I_\theta \cos\omega_{\theta y}t \frac{c\Lambda_S}{L_{SQ} + 6L_S} \frac{1}{\omega_\theta^2 + i\omega_\theta\omega/Q_\theta - \omega^2},$$

$$H_{\alpha zi} = \frac{i_{\theta z}(\omega)}{a_z(\omega)} = I_\theta \cos\omega_{\theta z}t \frac{c\Lambda_S}{L_{SQ} + 6L_S} \frac{1}{\omega_\theta^2 + i\omega_\theta\omega/Q_\theta - \omega^2}.$$

For a more detailed derivation of the above transfer functions and equations governing the noise of the SSA, refer to the final report entitled "Development of a Superconducting Six Axis Accelerometer", by H. J. Paik, et al, written for the Geophysics Laboratory of the Air Force Systems Command at Hanscom AFB, Massachusetts under Air Force Contract F19628-85-K-0042.

The experimental test apparatus housing the SSA will now be described. The SSA is operated in very quiet cryogenic vacuum space. A low boil-off super-insulated liquid helium dewar was constructed. The inner jacket of the dewar is constructed from thin aluminum fiberglass while the upper section of the jacket is made from thin fiberglass which has a lower thermal conductivity to mechanical strength ratio. The lower section of the jacket is made of aluminum. This combination helps to stiffen and electrically shield the lower section of the dewar without sacrificing the hold-time of the dewar. A long hold-time of liquid helium is needed for uninterrupted operation of the SSA and for reducing the boiling of liquid helium.

The outer jacket of the dewar is constructed from aluminum, making the entire unit extremely rigid. This rigidity is important to reduce long term angular drift of the dewar.

A super-insulated dewar was chosen over a more tradition nitrogen jacketed dewar to remove the noise of the boiling liquid nitrogen. The noise is of much more significance than the boiling helium since the liquid nitrogen would form the primary heat sink for the thermal radiation in the laboratory. No correlation between the activity in the helium bath and noise in the SSA has been seen.

The cryostat has been designed to minimize electromagnetic disturbances. In addition to outer and inner layers of aluminum, three additional layers of shielding lie between the inner and outer jacket of the dewar. Two layers of mu-metal ensure that any external magnetic field from the earth will be almost entirely excluded from the cryogenic space. The third shield constructed from a thin layer of lead foil placed in close contact with the inner aluminum jacket of the dewar forms a superconducting shield which excludes any residual electric and magnetic field.

Figure 13:
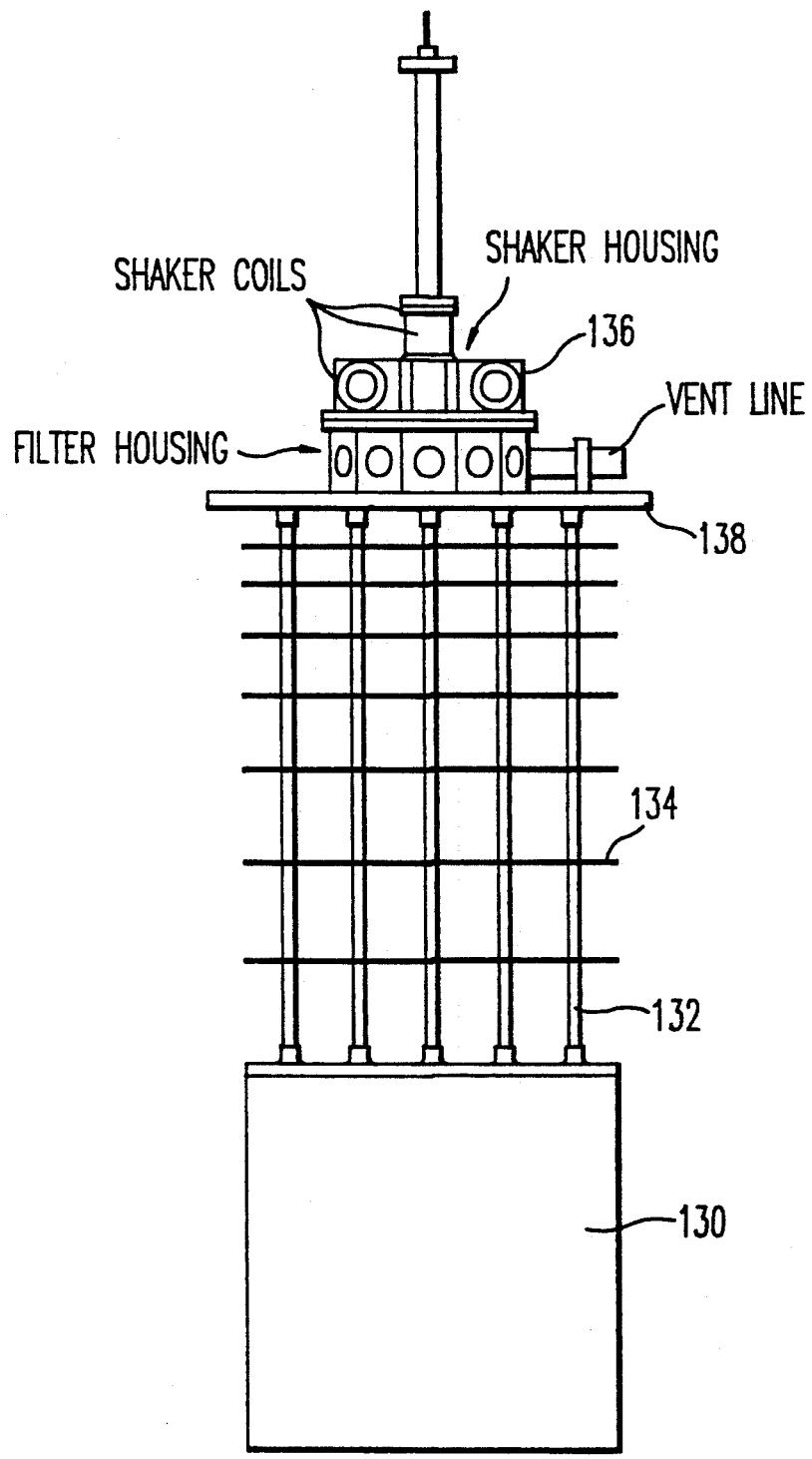
FIG. 13 is a schematic circuit diagram of the cryostat insert of the present invention.

The cryostat insert fitting snugly into the cryogenic space is shown schematically in FIG. 13. The top plate of the insert 138 bolts to the top of the cryostat and a large rubber O-ring seals the cryogenic space from the laboratory atmosphere.

The large aluminum vacuum can 130 at the base of the insert is anodized and coated internally with a thin layer of lead. The thin layer of lead forms a type-I superconducting shield which further reduces the magnetic flux level inside the cryogenic space. A final coating of photoresist such as Kodak KPR protects the thin coating of lead.

Hollow fiberglass tubes 132 support the vacuum can 130 from brass plate 138 at the top of the insert. Six of these tubes are equally spaced in a ring near the edge of the vacuum can while the seventh lies at its center. Each end of the hollow fiberglass tubes is fitted to an aluminum fixture used to bolt the tubes in place. The fiberglass tubes support several radiation shields 134 constructed from a copper-coated fiberglass PC board material. These radiation shields provide thermal shielding and mechanically stiffen the insert. The spacing between the radiation shields is largest just above the vacuum can and decreases towards the top of the cryostat, where the thermal gradient is greatest.

Two types of current leads enter the cryostat, high current leads constructed of copper magnet wire and low current leads constructed of manganin wire. As copper has a much higher thermal conductivity than manganin, copper is used only for those leads that must carry high current. All leads are spirally wound around the fiberglass support tubes 132. This winding increases the surface area of the wire and allows for greater cooling to take place.

Electrical isolation of the SSA is accomplished using a twelve-sided aluminum box 136 on top of the dewar insert containing filters for all leads entering the cryogenic space. On each of eleven faces of the filter box 136 are mounted one hermetically sealed 41 pin connector. The remaining face contains a vent line for the dewar. A twelve-sided copper wall fits concentrically inside filter box 136. Each face of the copper wall, except for the one with the vent line has 41 coaxial bushing mounted EMI filters (Model 9001-100-1010, Murata-Erie Corporation) passing through it. These filters are high quality pi filters and reduce the RF noise by 80 dB.

In addition to the RF filters at room temperature, there are eleven PC boards containing filter capacitors. These capacitors are mounted on top of the vacuum can in the helium space. These capacitors provide additional filtering and help insure that the RF noise level in the vacuum space is low.

Each pair of feedback and oscillator leads from the SSA are fed through separate hollow monel tubes that extend from brass plate 138 to the top of vacuum can 130, shielding the leads completely to the top of the vacuum can.

The SSA contains nine pairs of current charging leads, sixteen heat switches, six pairs of current sensing leads and six pairs of feedback control leads. With the large number and combinations of parameters to be simultaneously controlled, a computer is used to facilitate automatic control. The computer controls a programmable current supply, a precision digital voltmeter, and six lock-in amplifiers.

The operation of the computer in the present invention can be easily appreciated as routine by those of ordinary skill in the art, and a description of the operation is accordingly omitted for brevity.

High current relays are used to route current to the charging leads of the SSA. Low current relays are used to pulse the heat switches. Two separate instrumentation amplifiers differentially amplify the voltage across the current charging leads while current is being stored in the SSA. These outputs are used to control current protection circuits which shunt current away from the SSA if a preset voltage level is exceeded.

The computer also monitors high current relays to control the nitrogen boil-off heater to control the nitrogen boil-off cycle.

In the first embodiment of the present invention, separate coils were used for sensing and levitation-feedback. This required a total of 48 superconducting coils. In a second embodiment of the present invention, one coil is shared between the sensing and levitation-feedback functions, reducing the number of the required superconducting coils to 24. Only one coil is wound on each surface of the coil form facing the proof mass. The new sensing coils used have four times the surface area of the coils in the first embodiment. Larger sensing coils increases the coupling to the SQUID and the sensitivity of the device by a factor of 16 for a given driving current. The levitation coils used have 35% more surface area than those used in the first embodiment. The larger coils reduce the magnetic field required to levitate the proof mass by 16%, making the levitation more reliable.

Figure 18:
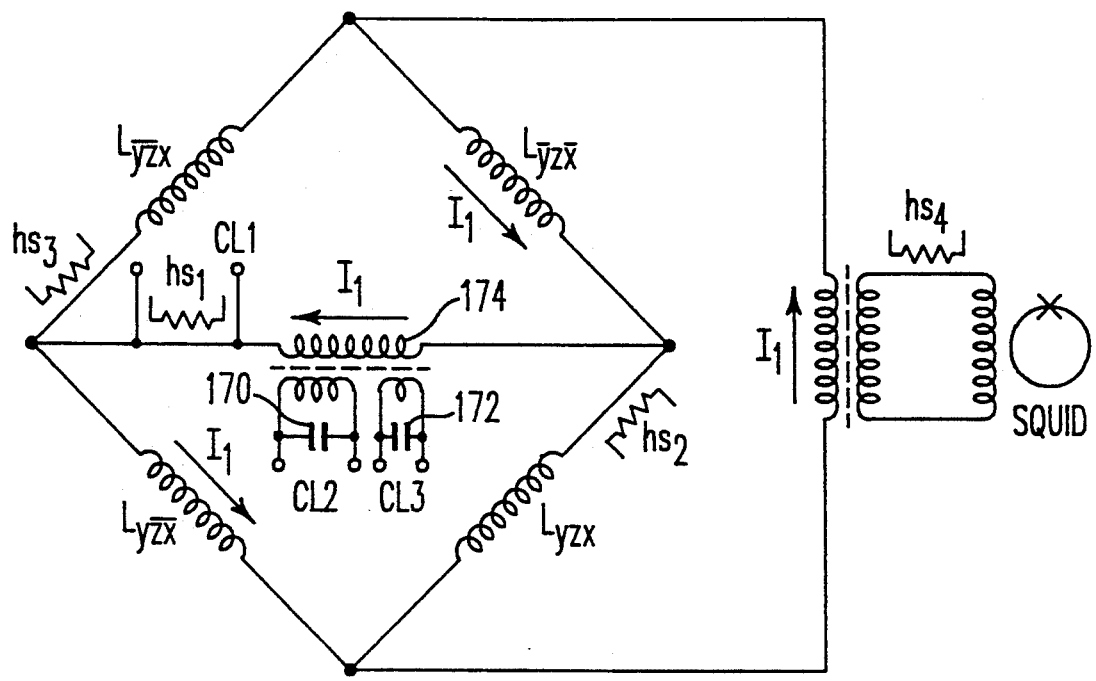
FIG. 18 is a schematic circuit diagram of the $r_x$ sensing-levitation-feedback circuitry of the SSA according to second and third embodiments of the present invention.

The linear sensing-levitation-feedback bridge circuit is shown in FIG. 18. The notation for the circuit inductances and heat switches is the same as in previous figures. For sensing, an AC carrier signal is applied through current leads CL2. This signal is coupled to the inductance bridge through a shielded superconducting transformer. A step-down turns ratio is used to increase the current. The shunt capacitor 170 resonates the primary inductor at the carrier frequency, thus increasing the drive current further, and providing low pass filtering for RF noise suppression.

In order to levitate the proof mass in the x direction, current $I_1$ is stored through current leads CL1 while heat switches hs1, hs2, hs3 and hs4 are turned on. Heat switch hs4 protects the SQUID from current spikes. The DC magnetic fields produced in inductors $L_{\bar{y}z\bar{x}}$ and $L_{yz\bar{x}}$ levitate the proof mass against gravity in the $+x$ direction and balance the bridge.

A feedback current proportional to the displacement $r_x$ is applied through current leads CL3. The shunt capacitor 172 filters RF noise induced through current leads CL3. The feedback signal is coupled to the inductance bridge through a shielded transformer 174. The feedback current modulates levitation current to keep the proof mass at its null position.

In the bridge circuit configuration of FIG. 18, the total current in $L_{\bar{y}zx}^-$ and $L_{yzx}^-$ is $I_1 + i_o \cos \omega_o t + i_F \cos \omega_s t$. The total current in $L_{\bar{y}zx}$ and $L_{yzx}$ is $i_o \cos \omega_o t + i_F \cos \omega_s t$. Total force generated in the x direction is $$F_x = \frac{L_o}{d_o} [(I_1 + i_o\cos \omega_o t + i_F\cos \omega_s t)^2 -$$

$$(i_o\cos \omega_o t + i_F\cos \omega_s t)^2] =$$

-continued
$$\frac{L_o}{d_o}(I_1^2 + 2I_1 i_o\cos \omega_o t + 2I_1 i_F\cos \omega_s t).$$

The first term in the above equation is the DC levitation and balancing force, the second term is the force at the carrier frequency which is filtered out by the proof mass and the final term is feedback force at the signal frequency.

Figure 19:
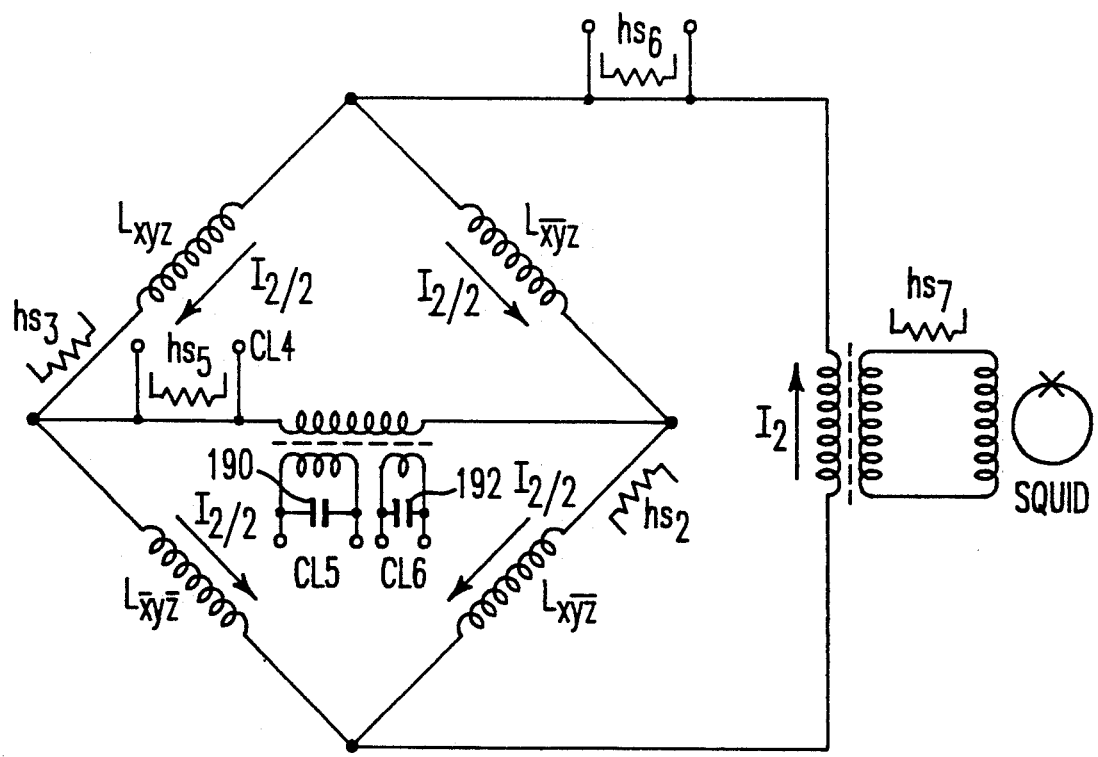
FIG. 19 is a schematic circuit diagram of the $\theta_x$ sensing-levitation-feedback circuitry of the SSA according to second and third embodiments of the present invention.

The angular sensing-levitation-feedback bridge circuit according to the second embodiment is shown in FIG. 19. An AC carrier signal is applied through current leads CL5. Shunt capacitors 190 and 192 perform the same function as in the linear circuit of FIG. 18.

No levitation force is required in the angular degrees of freedom. However, in order to activate the feedback circuit and to tune the angular resonance frequency to the linear resonance frequency, DC currents of equal amount $I_2/2$ are stored in all four bridge coils. A DC current $I_2$ is sent through current leads CL7 with heat switches hs5, hs6 and hs7 turned on. For fine control of the angular position, a small additional DC current $I_3$ is stored through current leads CL4 with heat switches hs5 and hs7 turned on.

According to the second embodiment of the present invention, the sensing levitation coils are arranged in six bridge circuits, the outputs of which are fed to a single SQUID as in the first embodiment. In a third embodiment, six SQUID devices are employed to separately amplify the outputs of the six sensing-levitation bridges. FIGS. 18 and 19 illustrate the sensing-levitation bridge circuits of the second embodiment each connected to an individual SQUID. The six bridges connected to respective six SQUID devices form the third embodiment. The six SQUID devices are connected to six respective lock-in amplifiers tuned to the respective AC carrier frequencies applied to each respective bridge circuit. An increase in the bandwidth and sensitivity of the SSA according to the third embodiment is realized.

A feedback current proportional to the displacement $\theta_x$ is applied to current leads CL6.

The total current in and $L_{\bar{x}yz}^-$ and $L_{\bar{x}y\bar{z}}^-$ is $I_2/2+I_3/2+i_o \cos \omega_o t+i_F\cos \omega_s t$. The total current in $L_{xyz}$ and $L_{x\bar{y}\bar{z}}$ is $-I_2/2+I_3/2+i_o \cos \omega_o t+i_F\cos \omega_s t$. The total force then in the $\theta_x$ direction is given as $$F_{\theta_x} = \frac{L_o}{d_o}\left[\left(\frac{I_2}{2} + \frac{I_3}{2} + i_o\cos \omega_o t + i_F\cos \omega_s t\right)^2 - \right.$$

$$\left. \left(-\frac{I_2}{2} + \frac{I_3}{2} + i_o\cos \omega_o t + i_F\cos \omega_s t\right)^2\right] =$$

$$\frac{L_o}{d_o}(I_2 I_3 + 2I_2 i_o\cos \omega_o t + 2I_2 i_F\cos \omega_s t).$$

The first term of the above equation is the DC balancing force, the second term is the force at the carrier frequency which is filtered out by the proof mass and the third term is the feedback force at the signal frequency.

Results of the testing of the SSA will now be described. The experimental parameters for the SSA are given in Table 1.

TABLE 1

Experimental parameters of the SSA.

| Parameter | Symbol | Value |
|---|---|---|
| Mass of the Proof Mass: | m | 0.144 kg |
| Mass of the SSA Assembly: | M | 4.8 kg |
| Moment of Inertia, Proof Mass: | I | $4.0 \times 10^{-5}$ kg m$^2$ |
| Moment of Inertia, SSA Assembly: | $I_M$ | $8.2 \times 10^{-3}$ kg m$^2$ |
| Secondary Inductance of Feedback Transformers: | L | 240 µH |
| Inductance of SQUID input Coil: | $L_{SQ}$ | 2.0 µH |
| Parallel Displacement of Inductance Coil Center from Proof Mass Center: | c | $1.35 \times 10^{-2}$ m |
| Perpendicular Displacement of Inductance Coil Center from Proof Mass Center | | |
| Levitation Coil: | $d_L$ | $1.69 \times 10^{-3}$ m |
| Sensing Coil: | $d_S$ | $1.51 \times 10^{-3}$ m |
| Levitation Coil Inductance Parameters: | $L_L$ | 31 µH |
| | $\Lambda_L$ | $6.1 \times 10^{-2}$ H/m |
| | $\beta_L$ | $1.8 \times 10^{-3}$ H |
| | $\gamma_L$ | 48 H/m$^2$ |
| Sensing Coil Inductance Parameters: | $L_S$ | 1.8 µH |
| | $\Lambda_S$ | $5.2 \times 10^{-3}$ H/m |
| | $\beta_S$ | $2.1 \times 10^{-4}$ H |
| | $\gamma_S$ | 5.9 H/m$^2$ |

The moments of inertia are computed from the mechanical design. The masses of the proof mass 40 and SSA assembly are measured. The input inductance of the SQUID, $L_{SQ}$, is taken from the manufacturer's data sheet.

Using the knowledge of the geometry of the levitation sensing coils in the SSA, the parameters which describe the inductance of each of the coils can be calculated. Each of the circular windings in the sensing and levitation coil can be thought of as a closed circular loop containing a current I. This loop creates a corresponding image current loop in the superconducting proof mass 40. By calculating the force between all current loops and image current loops and summing, the force on the proof mass from each coil can be calculated. This force will be a function of distance and orientation of the coil with respect to the proof mass. The force acting between the proof mass and one of the sensing or levitation coils can then be related to the variation in inductance with position. By comparing these two forces, the variation of inductance with position can be deduced.

Each sensing coil consists of 30 turns of Nb-Ti wire, with the inner and outer diameters of the coil being approximately 0.51 cm and 1.22 cm, respectively. Once proof mass 40 is levitated, the center of each wire in the sensing coil rests approximately 330 microns away from the proof mass surface. Using these parameters, the sensing coil inductance parameters were calculated and are given in Table 1.

Each levitation coil consists of two layers of Nb-Ti wire each layer holding 40 turns. The inner and outer diameter of each coil are approximately 1.28 cm and 2.11 cm, respectively. Once the proof mass is levitated, the centers of the wires which make up the upper layer of each levitation coil are approximately 440 microns away from the proof mass surface, and the centers of the wires making up the lower layer of each levitation coil are 570 microns away from the proof mass surface. Because each levitation coil consists of two layers, the calculation of the levitation coil parameters are slightly more complicated. Using these parameters, the levitation coil inductance parameters are calculated and are provided in Table 1.

Each of the expressions for $\Lambda$, $\gamma$, and $\beta$ ignores the rearrangement of the current in each of the superconducting wires due to the other superconducting wires and image currents, and neglects the finite size of the superconducting plane of the proof mass.

By storing a small current in each of the levitation circuits and allowing the trapped current in the circuit to decay, it is possible to measure the amount of flux trapped in each of the superconducting loops. Since the amount of flux trapped in the superconducting loop is the product of the inductance and the current stored, it is possible to determine the circuit inductance.

Storing small currents in each of the three linear levitation circuits does not levitate the proof mass and the levitation coil inductance must be computed using the spacing between the proof mass and the levitation coil when the proof mass is resting on the sensing coil. The total inductance measured is the sum of the levitation coils inductance and the secondary inductance of the feedback transformers. From these values the secondary inductance of the feedback transformers can be calculated and was found to be 240 µH.

The set of currents stored in the SSA that balance all six inductance bridges simultaneously is given in Table 2.

TABLE 2

Levitation currents, resonance frequencies, and mechanical quality factors for each of the six modes of the SSA

| Parameter | Symbol | Value |
|---|---|---|
| x Levitation Current | $I_{rx}$ | 2.639 A |
| y Levitation Current | $I_{ry}$ | 2.588 A |
| x Levitation Current | $I_{rz}$ | 2.455 A |
| $\theta_x$ Levitation Circuit 1 Current | $I_{1\theta x}$ | −0.280 A |
| $\theta_x$ Levitation Circuit 2 Current | $I_{2\theta x}$ | 0.280 A |
| $\theta_y$ Levitation Circuit 1 Current | $I_{1\theta y}$ | 0.786 A |
| $\theta_y$ Levitation Circuit 2 Current | $I_{2\theta y}$ | 1.014 A |
| $\theta_z$ Levitation Circuit 1 Current | $I_{1\theta z}$ | 0.918 A |
| $\theta_z$ Levitation Circuit 2 Current | $I_{2\theta z}$ | 0.882 A |
| x Resonance Frequency | $f_{rx}$ | 21.6 Hz |
| y Resonance Frequency | $f_{ry}$ | 21.5 Hz |
| z Resonance Frequency | $f_{rz}$ | 18.2 Hz |
| $\theta_x$ Resonance Frequency | $f_{\theta x}$ | 14.96 Hz |
| $\theta_y$ Resonance Frequency | $f_{\theta y}$ | 15.15 Hz |
| $\theta_z$ Resonance Frequency | $f_{\theta z}$ | 16.23 Hz |
| Mechanical Quality Factor for the Linear Degrees of Freedom | $Q_r$ | 220 |
| Mechanical Quality Factory for the Angular Degrees of Freedom | $Q_\theta$ | 700 |

It is pointed out that the levitation currents in the three coils are not equal.

The expected levitation force is:

$$f_{DCrx} = [2I_{rx}^2 - (I_{2\theta y}^2 + I_{1\theta y}^2)]\Lambda_L$$

$$f_{DCry} = [2I_{ry}^2 - (I_{2\theta x}^2 + I_{1\theta x}^2)]\Lambda_L$$

$$f_{DCrz} = [2I_{rz}^2 - (I_{2\theta x}^2 + I_{1\theta x}^2)]\Lambda_L$$

Setting these currents equal to the applied external force and substituting experimentally derived current values, $$\Lambda_L = 6.6 \times 10^{-2} \text{ H/m (from } f_{DCrx}),$$

$$\Lambda_L = 6.9 \times 10^{-2} \text{ H/m (from } f_{DCry}),$$

-continued $$\Lambda_L = 6.8 \times 10^{-2} \text{ H/m (from } f_{DCrz}).$$

The first of these experimental values is slightly lower than the other two. This can be understood if the fact that the diameter of the Nb-Ti wires varies slightly between coils, which changes the density of the windings and modifies $\Lambda_L$, is considered. The average experimental value, $6.8 \times 10^{-2}$ H/m is 11% higher than the theoretically calculated value, but is reasonable taken into account the crudeness of the inductance model employed.

The resonant frequencies can be calculated by substituting the experimentally derived currents, the average experimental value of $\Lambda_L$ and other theoretical parameters, which result in the following values:

$f_{rx} = 21.2$ Hz, $f_{ry} = 20.9$ Hz, $f_{rz} = 17.8$ Hz, $f_{\theta x} = 13.8$ Hz, $f_{\theta y} = 13.9$ Hz, $f_{\theta z} = 14.5$ Hz.

The theoretical linear resonant frequencies match the experimental resonance frequencies quite closely. The theoretical angular resonance frequencies are approximately 10% below the corresponding experimental values.

Figure 14:
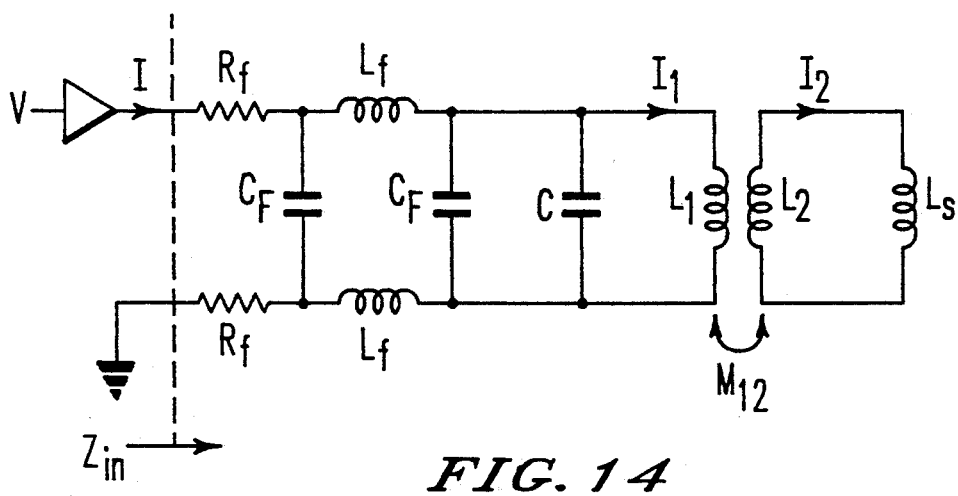
FIG. 14 is a schematic circuit diagram of the RF isolation transformer and circuitry used to drive each of the sensing circuits according to a first embodiment of the present invention.

Each of the sensing circuits in the SSA is driven by a low noise voltage to current converter connected to an RF isolation transformer as shown schematically in FIG. 14. $R_f$ represents the combined lead and filter resistance in each leg of the circuit and $C_f$ and $L_f$ represents the pi filters. The outputs of the two pi filters connect across a tank capacitance C placed in parallel with an isolation transformer. The RF isolation transformer is wound upon a hollow aluminum fixture and consists of primary and secondary coils of inductance $L_1$ and $L_2$, respectively. The mutual inductance of the isolation transformer is $M_{12}$. A thin brass sheet separates the primary and secondary windings, and the eddy current losses in this isolation transformer are represented by a resistance R (not shown), which is placed between the tank capacitor and the primary of the transformer.

The experimental parameters for each of the sensing circuits are shown in Table 3. The capacitance listed are the nominal values, as measured at room temperature.

TABLE 3

| Circuit | $L_1$ | $L_2$ | $M_{12}$ | C | $|Z_{in}|$ | $f_{exp}$ |
|---|---|---|---|---|---|---|
| $r_x$ | 3.75 mH | 0.17 mH | 0.53 mH | 10 μF | 86 Ω | 1.00 kHz |
| $r_y$ | 3.54 mH | 0.19 mH | 0.51 mH | 2 μF | 95 Ω | 2.12 kHz |
| $r_z$ | 3.54 mH | 0.20 mH | 0.50 mH | 1.3 μF | 109 Ω | 2.47 kHz |
| $\theta_x$ | 3.51 mH | 0.17 mH | 0.51 mH | 45 μF | 52 Ω | 0.50 kHz |
| $\theta_y$ | 3.57 mH | 0.19 mH | 0.51 mH | 5 μF | 90 Ω | 1.41 kHz |
| $\theta_z$ | 3.54 mH | 0.20 mH | 0.53 mH | 3 μF | 88 Ω | 1.84 kHz |

The transformer damping resistance is crucial in controlling the drive circuitry gain. This resistance increases as a function of frequency, and will correspondingly reduce the gain in the RF isolation transformer as the frequency of the tank circuit resonance increases, as shown in the following equation.

$$\left|\frac{I_2}{I}\right| = \frac{1}{R} \sqrt{\frac{L_{eff}}{C + C_f}} \frac{M_{12}}{L_2 + L_S},$$

where I is the drive current and $I_2$ is the sensing current as shown in FIG. 14.

The damping resistance can be computed by measuring the magnitude of the circuit input impedance $Z_{sub}$. Substituting experimental parameters from Table 3 into expressions for R, $L_{eff}$, resonance frequency and drive current transfer function, the theoretical parameters are derived as listed in Table 4. The theoretical values for the resonance frequencies are all slightly higher than the corresponding experimental values. This is due to the fact that the capacitance value is measured at room temperature whereas the resonance frequency is measured with the circuit at 4.2 K.

TABLE 4

| | Theoretical parameters for RF isolation circuits in the SSA | | | |
|---|---|---|---|---|
| Circuit | $L_{eff}$ | $f_{theory}$ | R | Transfer Function |
| $r_x$ | 2.11 mH | 1.09 kHz | 2.5 Ω | $I_{rx}/I = 17.5$ |
| $r_y$ | 2.18 mH | 2.31 kHz | 11 Ω | $I_{ry}/I = 7.6$ |
| $r_z$ | 2.30 mH | 2.72 kHz | 15 Ω | $I_{rz}/I = 6.6$ |
| $\theta_x$ | 2.00 mH | 0.53 kHz | 1.04 Ω | $I_{\theta x}/I = 19$ |
| $\theta_y$ | 2.21 mH | 1.49 kHz | 5 Ω | $I_{\theta y}/I = 11$ |
| $\theta_z$ | 2.15 mH | 1.92 kHz | 6.6 Ω | $I_{\theta z}/I = 8.5$ |

The residual misbalance of the SSA will now be discussed. Each of the sensing circuits in the SSA is balanced by adjusting the levitation current in the six levitation circuits which surround the proof mass. This process is performed in an iterative fashion and is limited by the resolution of the current supply and a small residual misbalance existing in each of the sensing circuits.

The in-phase component of this misbalance is due to a slight error in the proof mass position, and is inductive in nature. In practice, this component of the misbalance is removed by sending a small DC current into each of the feedback transformers and adjusting the position of the proof mass until each sensing bridge in the SSA is nulled.

The out-of-phase component of the misbalance is independent of proof mass position, and is resistive in nature. As each sensing coil in the SSA is essentially identical and suffers the same resistive loss, this resistive portion should vanish. This is due to the fact that each sensing coil is formed from a single layer of windings of equal turns The levitation coils are a two layer coil, the fabrication of which is more difficult to control and these coils are therefore less well matched.

Figure 15:
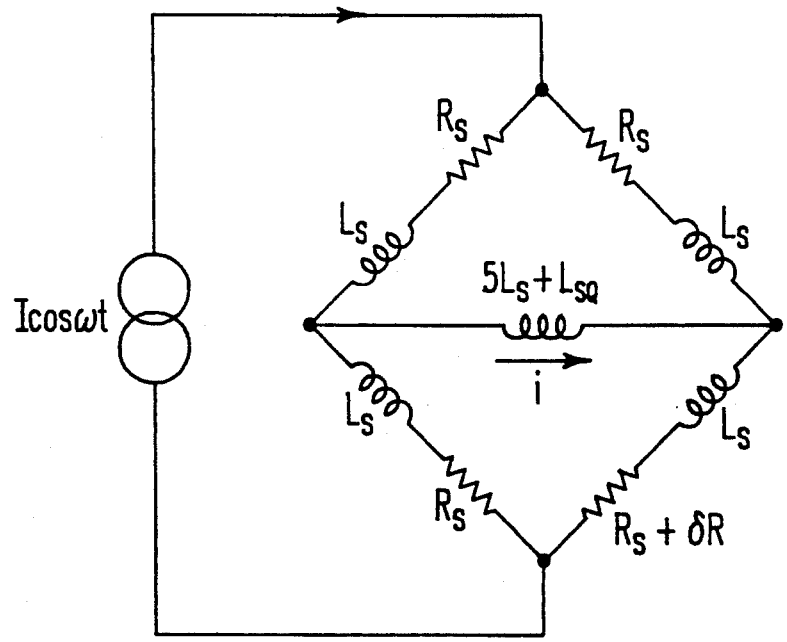
FIG. 15 is a schematic circuit diagram of a bridge circuit displaying the resistive components of the sensing coils of the present invention.

The residual resistive misbalance will limit the amplitude of the flux signal through the SQUID loop and thereby limit the maximum amplitude of the current in a sensing bridge. This can be shown quantitatively in reference to FIG. 15 by the following equation:

$$\Phi = \frac{M_{SQ} I R_S}{4\omega(6L_S + L_{SQ})} \frac{\delta R_S}{R_S},$$

where $M_{SQ} = 2.0 \times 10^{-8}$ H being the mutual inductance between the SQUID input coil and the SQUID loop.

The slew rate of the SQUID feedback controller determines the maximum signal size, $\Phi_{max}$, that the SQUID amplifier can handle. Thus, the maximum amplitude of the current into a sensing bridge is $$I_{max} = \frac{4\omega(6L_S + L_{SQ})\Phi_{max}}{M_{SQ}R_S(\delta R_S/R_S)}$$

For the SQUID controller used in the present invention, the maximum signal size is $8.0 \times 10^3 \Phi_o$ up to about 60 Hz. Above this it drops off with frequency, reaching $1 \Phi_o$ at approximately 20 kHz. At 2.5 kHz, the maximum signal is approximately $20 \Phi_o$. Assuming a 5% misbalance in $R_S$, $I_{max} = 0.34$ A. At lower frequencies $\Phi_{max}$ will be higher so $I_{max}$ should be higher also.

The three linear acceleration circuits are calibrated by driving a shaker along the vertical axis and comparing the signal from the vertically oriented room temperture accelerometer to the signals from the SSA. The shaker is free to translate in the x, y and z linear directions and rotate about the z axis. The shaker is mounted on top of the RF filter box on the cryostat insert.

The combined structure which supports the SSA can be modelled as a compound pendulum which is supported by a spring. The mode structure of this support is in general quite complicated, but only the frequency response well below the resonant modes of the suspension structure is of concern. At these low frequencies, the modes of the suspension structure can be ignored. At higher frequencies, the suspension can be thought of as a second order low pass filter. This filtering of high frequency noise is important in order that the dynamic range of the SSA is not exceeded, which can cause the SQUID to become unlocked.

The theoretical transfer functions for the three linear degrees of freedom are $$(H_{axi})_{rms} = \frac{I_r}{\sqrt{2}} \frac{\Lambda_S}{L_{SQ} + 6L_S} \frac{1}{\omega_r^2 + i\omega_r\omega/Q_r - \omega^2},$$

$$(H_{ayi})_{rms} = \frac{I_r}{\sqrt{2}} \frac{\Lambda_S}{L_{SQ} + 6L_S} \frac{1}{\omega_r^2 + i\omega_r\omega/Q_r - \omega^2},$$

$$(H_{azi})_{rms} = \frac{I_r}{\sqrt{2}} \frac{\Lambda_S}{L_{SQ} + 6L_S} \frac{1}{\omega_r^2 + i\omega_r\omega/Q_r - \omega^2}.$$

These equations are derived for identical resonance frequences and identical drive current levels. As the three linear resonance frequencies differ slightly, $\omega_r$ must be replaced by $\omega_{rx}$, $\omega_{ry}$ and $\omega_{rz}$ in the above three equations. As the three drive levels also differ, $I_r$ must be similarly replaced by $I_{rx}$, $I_{ry}$ and $I_{rz}$. Making these substitutions for the case when $\omega << \omega_r$, the following equations result $$(H_{axi})_{rms} = \frac{I_{rx}}{4\sqrt{2} \; \pi^2 f_{rx}^2} \frac{\Lambda_S}{L_{SQ} + 6L_S},$$

$$(H_{ayi})_{rms} = \frac{I_{ry}}{4\sqrt{2} \; \pi^2 f_{ry}^2} \frac{\Lambda_S}{L_{SQ} + 6L_S},$$

$$(H_{azi})_{rms} = \frac{I_{rz}}{4\sqrt{2} \; \pi^2 f_{rz}^2} \frac{\Lambda_S}{L_{SQ} + 6L_S}.$$

Figure 16:
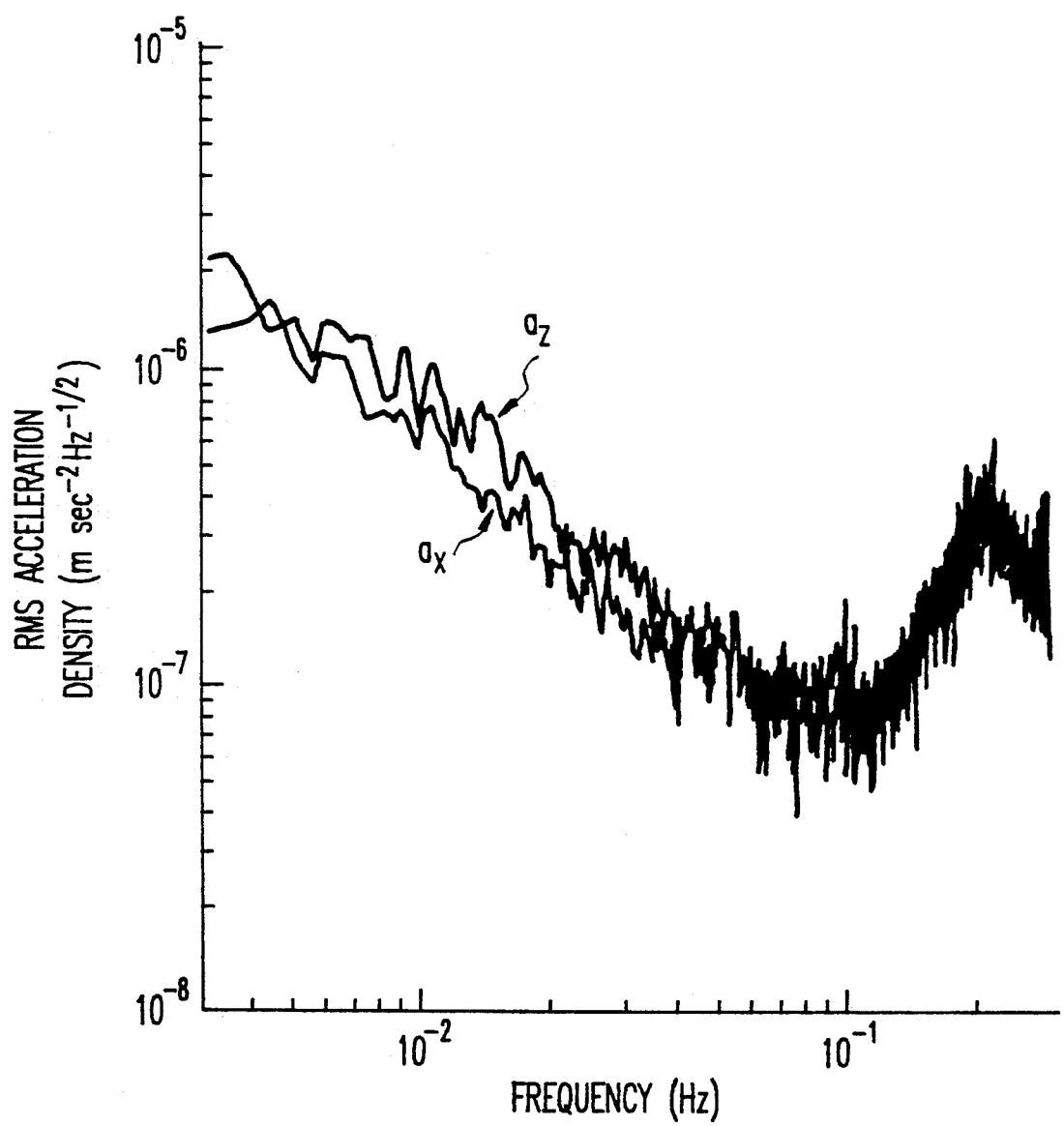
FIG. 16 shows a plot of the very low frequency noise spectra of the SSA measured by the $r_x$ and $r_z$ sensing circuits, according to a first embodiment of the present invention.

A log-log plot showing the low-frequency noise spectra from 0.3 mHz to 0.3 Hz for the $r_x$ and $r_z$ sensing circuits is shown in FIG. 16. Above 0.1 Hz, the spectrum is dominated by the background seismic noise of the laboratory. Below 0.1 Hz, the spectrum appears to be dominated by 1/f type noise. The broad peak around 0.2 Hz corresponds to the seismic noise of the earth reported by seismologists which is due to the periodic pounding of the shores by ocean waves. Its amplitude is strongly dependent upon a number of factors, including the distance to the shore and the amplitude to the ocean waves.

The three angular acceleration circuits are calibrated by driving the shaker about the vertical axis in comparing the three angular signals from the SSA to the rms amplitude of the angular motion. The theoretical transfer functions for the three angular degrees of freedoms are $$(H_{axi})_{rms} = \frac{I_\theta}{\sqrt{2}} \frac{c\Lambda_S}{L_{SQ} + 6L_S} \frac{1}{\omega_\theta^2 + i\omega_\theta\omega/Q_r - \omega^2},$$

$$(H_{ayi})_{rms} = \frac{I_\theta}{\sqrt{2}} \frac{c\Lambda_S}{L_{SQ} + 6L_S} \frac{1}{\omega_\theta^2 + i\omega_\theta\omega/Q_r - \omega^2},$$

$$(H_{azi})_{rms} = \frac{I_\theta}{\sqrt{2}} \frac{c\Lambda_S}{L_{SQ} + 6L_S} \frac{1}{\omega_\theta^2 + i\omega_\theta\omega/Q_r - \omega^2}.$$

Since actual angular resonance frequencies differ slightly, $\omega_\theta$ must be replaced by $\omega_{\theta x}$, $\omega_{\theta y}$, and $\omega_{\theta z}$ in each of the three equations. Similarly, $I_\theta$ must be replaced by $I_{\theta x}$, $I_{\theta y}$, $I_{\theta z}$. Making these substitutions and taking the case were $\omega << \omega_\theta$, we find $$(H_{axi})_{rms} = \frac{I_{\theta x}}{4\sqrt{2} \; \pi^2 f_{\theta x}^2} \frac{c\Lambda_S}{L_{SQ} + 6L_S},$$

$$(H_{ayi})_{rms} = \frac{I_{\theta y}}{4\sqrt{2} \; \pi^2 f_{\theta y}^2} \frac{c\Lambda_S}{L_{SQ} + 6L_S},$$

$$(H_{azi})_{rms} = \frac{I_{\theta z}}{4\sqrt{2} \; \pi^2 f_{\theta z}^2} \frac{c\Lambda_S}{L_{SQ} + 6L_S}.$$

Figure 17A:
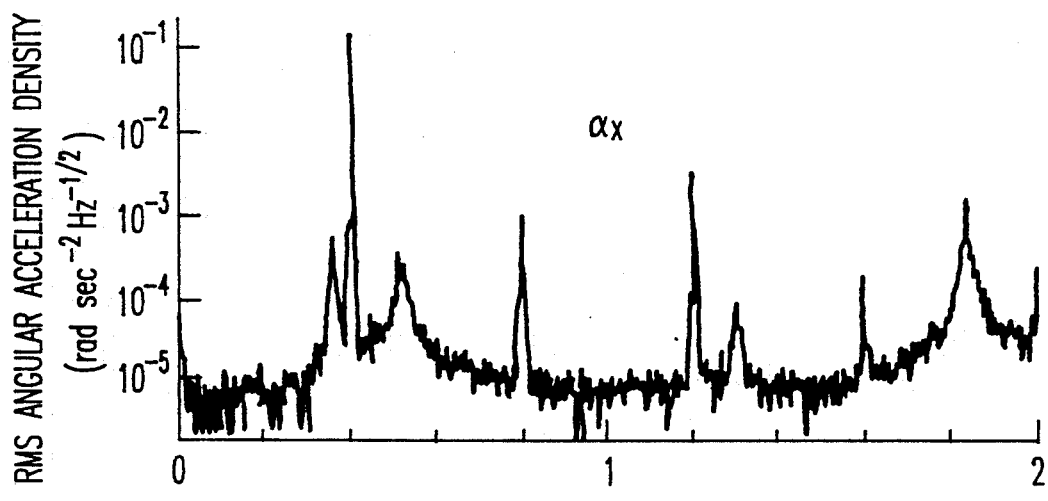
FIG. 17 shows a plot of the low frequency seismic noise spectra of the SSA measured by the $\theta_x$, $\theta_y$ and $\theta_z$ sensing circuits, according to a first embodiment of the present invention.
Figure 17B:
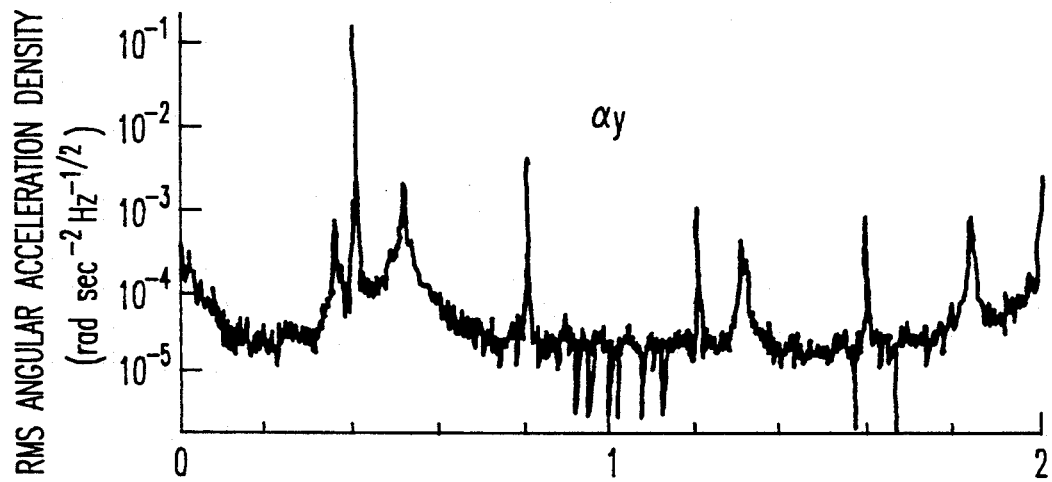
Figure 17C:
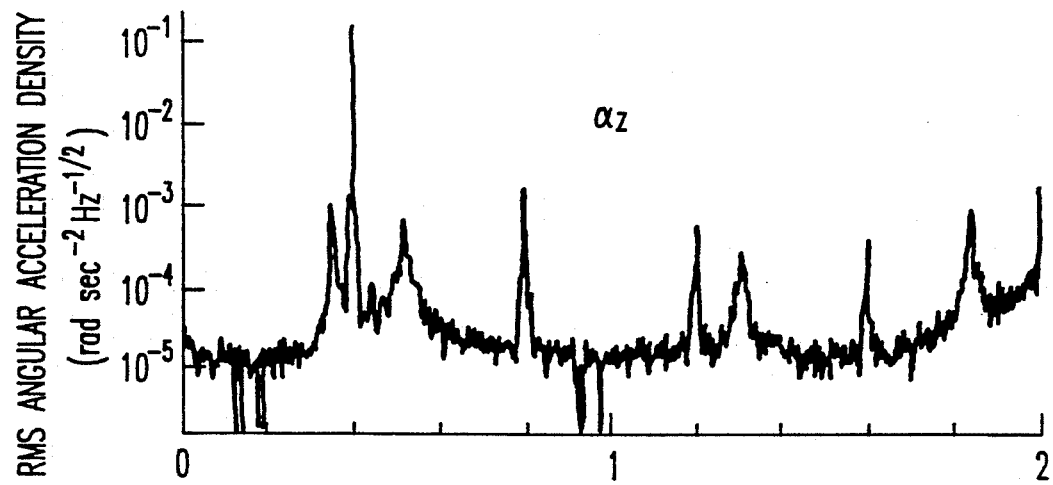

The low frequency spectra of seismic noise measured by the $\theta_x$, $\theta_y$ and $\theta_z$ sensing circuits is shown in FIG. 17. The figure shows the fundamental and harmonics of the angular calibration signal at 0.4 Hz. The four other peaks are due to modes of the suspension, such as the pendulum mode at 0.36 Hz and the vertical spring mode at 1.3 Hz.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A superconducting accelerometer for detecting plural degrees of freedom of acceleration simultaneously, comprising:
   a proof mass;
   a plurality of cubic metallic coil forms positioned opposite plural faces of said proof mass;

coil means, mounted on each of said coil forms, for sensing relative motion of said proof mass and levitating said proof mass; and circuit means, connected to said coil means, for producing an output indicative of an acceleration in at least one degree of freedom of said proof mass, and for storing a persistent current to magnetically levitate said proof mass;

wherein said coil forms have a superconducting transition temperature lower than an operating temperature of said circuit means.

2. A superconducting accelerometer as recited in claim 1, wherein said coil means comprises:

a first plurality of superconducting coils mounted on a plurality of faces of each of said coil forms and disposed between said proof mass and said coil forms for sensing relative motion of said proof mass; and a second plurality of superconducting coils mounted concentric with said sensing coils for providing a levitating force; and wherein said circuit means comprises:

at least one first superconducting circuit in which said sensing coils are interconnected, said first circuit having an output indicative of an acceleration in at least one degree of freedom of said proof mass; and at least one second superconducting circuit in which said levitation coils are interconnected and in which a persistent current is capable of being stored, said second circuit applying a force against said proof mass to magnetically levitate said proof mass.

3. A superconducting accelerometer as recited in claim 2, further comprising:

a plurality of coil form holders for holding said coil forms.

4. A superconducting accelerometer as recited in claim 3, wherein said coil form holder comprises:

a substantially rectangular plate disposed at one end of an open cylinder, said rectangular plate containing a plurality of circular apertures; and a cylindrical member concentrically disposed in said open cylinder and attached at one end to a center portion of said rectangular plate.

5. A superconducting accelerometer as recited in claim 3, further comprising:

a precision mounting cube;

said plurality of coil form holders fitting together inside said precision mounting cube to form a structure having a cubic void in which said coil forms and proof mass are positioned;

one of said coil forms being positioned in each corner of said cubic void; and said coil forms being securely attached to said coil form holders.

6. A superconducting accelerometer, as recited in claim 5, further comprising:

said proof mass comprising a plurality of superconducting plates, each plate having grooves and slits which are interconnected to interlock said plates in three mutually orthogonal intersecting planes;

said proof mass positioned in the center of said cubic void; and said coil forms positioned in octants formed by said mutually orthogonal interlocked plates.

7. A superconducting accelerometer as recited in claim 2, further comprising:

said proof mass comprising a plurality of superconducting plates, each plate having grooves and slits which are interconnected to interlock said plates in three mututally orthogonal intersecting planes.

8. A superconducting accelerometer as recited in claim 7, said proof mass comprising:

first and second square plates having matching grooves and slits disposed on lines drawn through the midpoints of opposite sides of said square plates allowing said square plates to interlock perpendicularly along said lines; and third and fourth rectangular plates one half the size of said second and first plates, having grooves and slits disposed upon a line joining the midpoints of the opposite longer sides of said rectangular plates, said third and fourth plates interlocking perpendicularly along matching grooves of one of said first and second plates.

9. A superconducting accelerometer as recited in claim 7, further comprising:

cubic metallic coil forms positioned in octants formed by said mutually orthogonal intersecting plates.

10. A superconducting accelerometer as recited in claim 2, said first superconducting circuit further comprising:

said superconducting sensing coils arranged to form a plurality of inductance bridge sensing circuits;

heat switches for discharging flux trapped in said inductance bridge sensing circuits;

a SQUID amplifier;

a first transformer coupling said SQUID amplifier to said inductance bridge sensing circuits;

an oscillator and a second transformer coupled across each of said plurality of inductance bridge sensing circuits for supplying current to each of said inductance bridge sensing circuit; and a plurality of lock-in amplifiers connected to said SQUID amplifier for demodulating an output signal of said SQUID amplifier.

11. A superconducting accelerometer as recited in claim 10, further comprising:

shielding means surrounding said heat switches and said first and second transformers for preventing RF frequency noise from entering said first superconducting circuit.

12. A superconducting accelerometer as recited in claim 10, further comprising:

a precision mounting cube;

a plurality of coil form holders fitting together inside said precision mounting cube to form a structure having a cubic void in which said coil forms and proof mass are positioned;

said coil forms comprising metallic cubes one of said cubic coil forms being positioned in each corner of said cubic void; and said cubic coil forms being securely attached to said coil form holders.

13. A superconducting accelerometer as recited in claim 2, said second superconducting circuit further comprising:

said superconducting levitation coils arranged to form a plurality of inductance bridge levitation circuits and a plurality of inductance loop levitation circuits, said inductance bridge and loop levitation circuits controlling levitation of said proof mass;

heat switches and a first current source for storing flux in said inductance bridge and loop levitation circuits; and a second current source and a third transformer coupled to each of said inductance loop levitation circuits and each of said inductance bridge levitation circuits provide feedback for maintaining said proof mass in a null position.

14. A superconducting accelerometer as recited in claim 13, further comprising:

shielding means surrounding said heat switches and said third transformers for preventing RF frequency noise from entering said second superconducting circuit.

15. A superconducting accelerometer as recited in claim 13, further comprising:

a precision mounting cube;

a plurality of coil form holders fitting together inside said precision mounting cube to form a structure having a cubic void in which said coil forms and proof mass are positioned;

said coil forms comprising metallic cubes one of said cubic coil forms being positioned in each corner of said cubic void; and said cubic coil forms being securely attached to said coil form holders.

16. A superconducting accelerometer as recited in claim 1, wherein said coil means comprises:

a plurality of superconducting coils mounted on said coil forms and disposed between said coil forms and said proof mass, each of said superconducting coils both sensing relative motion of said proof mass and magnetically levitating said proof mass; and wherein said circuit means comprises:

at least one superconducting circuit in which said superconducting coils are interconnected and in which a persistent current is capable of being stored, said superconducting circuit having an output indicative of an acceleration of said proof mass and applying a force against said proof mass to magnetically levitate said proof mass.

17. A superconducting accelerometer, as recited in claim 16, further comprising:

a plurality of coil form holders for securely holding said coil forms.

18. A superconducting accelerometer as recited in claim 17, said coil form holder comprising:

a substantially rectangular plate disposed at one end of an open cylinder, said rectangular plate containing a plurality of circular apertures; and a cylindrical member concentrically disposed in said open cylinder and attached at one end to a center portion of said rectangular plate.

19. A superconducting accelerometer as recited in claim 17, further comprising:

a precision mounting cube;

said plurality of coil form holders fitting together inside said precision mounting cube to form a structure having a cubic void;

one of said coil forms being positioned in each corner of said cubic void; and said coil forms being securely attached to said coil form holders.

20. A superconducting accelerometer, as recited in claim 19, further comprising:

said proof mass comprising a plurality of superconducting plates, each plate having grooves and slits which are interconnected to interlock said plates in three mututally orthogonal intersecting planes;

said proof mass positioned in the center of said cubic void; and said coil forms positioned in octants formed by said mutually orthogonal interlocked plates.

21. A superconducting accelerometer as recited in claim 16, further comprising:

said proof mass comprising a plurality of superconducting plates, each plate having grooves and slits which are interconnected to interlock said plates in three mututally orthogonal intersecting planes.

22. A superconducting accelerometer as recited in claim 21, said proof mass comprising:

first and second square plates both having matching grooves and slits disposed on lines drawn through the midpoints of opposite sides of said square plates allowing said square plates to interlock perpendicularly along said lines; and third and fourth rectangular plates one half the size of said second and first plates, having grooves and slits disposed upon a line joining the midpoints of the opposite longer sides of said rectangular plates, said third and fourth plates interlocking perpendicularly along matching grooves of one of said first and second plates.

23. A superconducting accelerometer as recited in claim 21, further comprising:

cubic metallic coil forms positioned in octants formed by said mutually orthogonal intersecting plates.

24. A superconducting accelerometer as recited in claim 16, further comprising:

said superconducting coils arranged to form a plurality of inductance bridge circuits;

heat switches for discharging flux in said inductance bridge circuits;

a plurality of SQUID amplifers;

a plurality of first transformers each coupling a respective one of said plurality of SQUID amplifiers to a respective ore of said inductance bridge circuits;

an oscillator and a second transformer coupled across each of said inductance bridge circuits for supplying current to each of said inductance bridge circuits; and a plurality of lock-in amplifiers connected to respective of said SQUID amplifiers for amplifying an output signal from each of said plurality of SQUID amplifiers.

25. A superconducting accelerometer as recited in claim 16, further comprising:

said superconducting coils arranged to form a plurality of inductance bridge circuits;

heat switches for discharging flux in said inductance bridge circuits;

a SQUID amplifier;

a first transformer coupling said SQUID amplifier to said inductance bridge circuits;

an oscillator and a second transformer coupled across each of said inductance bridge circuits for supplying current to each of said inductance bridge circuits; and a plurality of lock-in amplifiers connected to said SQUID amplifier for demodulating an output signal of said SQUID amplifier.

26. A superconducting accelerometer as recited in claim 25, further comprising:

a plurality of tank circuits each resonating at a different frequency formed by connecting a capacitor across each of said second transformers;

wherein output currents indicative of a plurality of degrees of freedom of acceleration of said proof mass are output to said SQUID, said output currents having frequencies equal to said resonant frequencies of said tank circuits, and said lock-in amplifiers having respective lock-in frequencies equal to said respective resonant frequencies of said tank circuits, allowing separate recovery of said output currents.

27. A superconducting accelerometer as recited in claim 25, comprising:

shielding means surrounding said heat switches and said first and second transformers for preventing RF frequency noise from entering said superconducting circuit.

28. A superconducting accelerometer as recited in claim 25, further comprising:

a precision mounting cube;

a plurality of coil form holders fitting together inside said precision mounting cube to form a structure having a cubic void in which said coil forms and proof mass are positioned;

said coil forms comprising metallic cubes one of said cubic coil forms being positioned in each corner of said cubic void; and said cubic coil forms being securely attached to said coil form holders.

29. A superconducting accelerometer for detecting plural degrees of freedom of acceleration simultaneously, comprising:

a proof mass;

a plurality of cubic metallic coil forms positioned opposite plural faces of said proof mass;

coil means, mounted on each of said coil forms, for sensing relative motion of said proof mass and levitating said proof mass; and circuit means, connected to said coil means, for producing an output indicative of an acceleration in at least one degree of freedom of said proof mass, and for storing a persistent current to magnetically levitate said proof mass;

wherein said coil means comprises:

a first plurality of superconducting coils mounted on a plurality of faces of each of said coil forms and disposed between said proof mass and said coil forms for sensing relative motion of said proof mass; and a second plurality of superconducting coils mounted concentric with said sensing coils for providing a levitating force; and wherein said circuit means comprises:

at least one first superconducting circuit in which said sensing coils are interconnected, said first circuit having an output indicative of an acceleration in at least one degree of freedom of said proof mass; and at least one second superconducting circuit in which said levitation coils are interconnected and in which a persistent current in capable of being stored, said second circuit applying a force against said proof mass to magnetically levitate said proof mass;

said cubic coil forms having first and second circular faces on each of three faces of said cubic coil form;

said first and second surfaces being concentrically arranged and being offset in height to form a step between said two surfaces;

one of said sensing coils being mounted on each of said first surfaces; and one of said levitation coils being mounted on each of said second surfaces.

30. A superconducting accelerometer for detecting plural degrees of freedom of acceleration simultaneously, comprising:

a proof mass;

a plurality of coil forms positioned opposite plural faces of said proof mass;

coil means, mounted on each of said coil forms, for sensing relative motion of said proof mass and levitating said proof mass; and circuit means, connected to said coil means, for producing an output indicative of an acceleration in at least one degree of freedom of said proof mass, and for storing a persistent current to magnetically levitate said proof mass;

wherein said coil means comprises:

a first plurality of superconducting coils mounted on a plurality of faces of each of said coil forms and disposed between said proof mass and said coil forms for sensing relative motion of said proof mass; and a second plurality of superconducting coils mounted concentric with said sensing coils for providing a levitating force; and wherein said circuit means comprises:

at least one first superconducting circuit in which said sensing coils are interconnected, said first circuit having an output indicative of an acceleration in at least one degree of freedom of said proof mass; and at least one second superconducting circuit in which said levitation coils are interconnected and in which a persistent current in capable of being stored, said second circuit applying a force against said proof mass to magnetically levitate said proof mass;

wherein said first superconducting circuit comprises:

said sensing coils arranged to form a plurality of inductance bridge sensing circuits;

heat switches for discharging flux trapped in said inductance bridge sensing circuits;

a SQUID amplifier;

a first transformer coupling said SQUID amplifier to said inductance bridge sensing circuits;

an oscillator and a second transformer coupled across each of said plurality of inductance bridge sensing circuits for supplying current to each of said inductance bridge sensing circuit;

a plurality of lock-in amplifiers connected to said SQUID amplifier for demodulating an output signal of said SQUID amplifier; and a plurality of tank circuits, each resonating at a different frequency, formed by connecting a capacitor across each of said second transformers;

wherein output currents indicative of a plurality of degrees of freedom of acceleration of said proof mass are output to said SQUID, said output currents having respective frequencies equal to said respective resonant frequencies of said tank circuits, and said lock-in amplifiers having respective lock-in frequencies equal to said respective resonant frequencies of said tank circuits, allowing separate recovery of said output currents.

* * * * *